United States Patent
Suemura et al.

(10) Patent No.: US 6,445,473 B1
(45) Date of Patent: Sep. 3, 2002

(54) OPTICAL SWITCHING APPARATUS USING WAVELENGTH DIVISION MULTIPLEXING TECHNOLOGY

(75) Inventors: Yoshihiko Suemura; Naoya Henmi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/276,671

(22) Filed: Mar. 26, 1999

(30) Foreign Application Priority Data

Mar. 26, 1998 (JP) .......................................... 10-079500

(51) Int. Cl.[7] .......................... H04B 10/00; H04B 10/12

(52) U.S. Cl. ........................ 359/128; 359/117; 359/139

(58) Field of Search ................................ 359/117, 128, 359/124, 139

(56) References Cited

U.S. PATENT DOCUMENTS

| | | | | |
|---|---|---|---|---|
| 5,005,166 A | * | 4/1991 | Suzuki et al. ............... | 359/117 |
| 5,194,977 A | * | 3/1993 | Nishio ........................ | 359/123 |
| 5,341,234 A | * | 8/1994 | Suzuki et al. ............... | 359/117 |
| 5,450,224 A | * | 9/1995 | Johansson ................... | 359/119 |
| 5,450,225 A | * | 9/1995 | Bostica et al. .............. | 340/2.1 |
| 5,475,679 A | * | 12/1995 | Munter ....................... | 359/117 |
| 5,805,320 A | * | 9/1998 | Kuroyanagi et al. ........ | 359/117 |
| 5,896,212 A | * | 4/1999 | Sotom et al. ............... | 359/117 |
| 5,973,117 A | * | 10/1999 | Onda et al. ................. | 530/327 |
| 5,973,809 A | * | 10/1999 | Okayama .................... | 359/124 |
| 6,005,698 A | * | 12/1999 | Huber et al. ................ | 359/117 |
| 6,128,115 A | * | 10/2000 | Shiragaki .................... | 359/117 |
| 6,234,178 B1 | * | 5/2001 | Goble et al. ................ | 128/898 |
| 6,271,949 B1 | * | 8/2001 | Suemura et al. ............ | 359/117 |
| 6,320,684 B2 | * | 11/2001 | Uehara ....................... | 359/110 |
| 6,333,800 B1 | * | 12/2001 | Suemura et al. ............ | 359/128 |

FOREIGN PATENT DOCUMENTS

| | | |
|---|---|---|
| CA | 2292942 | 6/2000 |
| JP | 1-109991 | 4/1989 |
| JP | 2-27892 | 1/1990 |
| JP | 3-100526 | 4/1991 |
| JP | 3-219793 | 9/1991 |
| JP | 7-59127 | 3/1995 |

OTHER PUBLICATIONS

Y. Maeno et al., "The Possibility of Optical Switching Technology for Parallel Processing Systems", IEICE, SB–9–5, (1996), pp. 719–720.

H. Takahashi et al., "Wavelength Multiplexer Based on $SiO_2$–$Ta_2O_5$ Arrayed–Waveguide Grating", Journal of Lightwave Technology, vol. 12, No. 6, Jun. 1994, pp. 989–995 with Abstract.

R. Schnabel et al., "Polarisation Insensitive Frequency Conversion of a 10–Channel OFDM Signal Over 275 GHz in a Semiconductor Laser Amplifier", Proceeding of 19th European Conference on Optical Communication, vol. 13, ThP 12.4, Sep. 1993, pp. 65–68 with Abstract.

* cited by examiner

Primary Examiner—Leslie Pascal
Assistant Examiner—Augustin Bello
(74) Attorney, Agent, or Firm—Sughrue Mion, PLLC

(57) ABSTRACT

To optimize the number of optical gate switches required by an optical switching apparatus which comprises an optical space switch and wavelength selectors, the following process as a preliminary process of introducing optical signals into the optical space switch, is carried out. In detail, the preliminary process is optically converting the optical signals in relation to the number of input ports of the optical space switch, by optically processing the optical signals. As the results, the number of processed optical signals responding to the input ports and the processed number of wavelengths of each processed optical signal is equal to each other, and thereby, the optimization is achieved.

20 Claims, 12 Drawing Sheets

OPTICAL SWITCHING APPARATUS USING WAVELENGTH DIVISION MULTIPLEXING TECHNOLOGY

BACKGROUND OF THE INVENTION

This invention relates to an optical switching apparatus applied wavelength division multiplexing techniques thereto.

The optical switching apparatus switches optical signals without converting them into electrical signals. Recently, such optical switching apparatus might be expected to realize switching with a large amount of capacity which can not be realized by an electrical switching apparatus. In the art of optical switch, there are the following types: an optical space switching (or an optical space-division switching), an optical wavelength switching (or an optical wavelength-division switching), an optical time switching (or an optical time-division switching), and combinations thereof, such as an optical wavelength/space switching (an optical wavelength-division/space-division switching) and an optical wavelength/time switching (an optical wavelength-division/time-division switching).

In the optical space switching, channels are assigned only to spaces. FIG. 1 shows an example of an optical space switching apparatus. In the example zeroth through third input channels are assigned to zeroth through third input ports 10-0 through 10-3, respectively. On the other hand, zeroth through third output channels are assigned to zeroth through third output ports 11-0 through 11-3, respectively. Such optical space switching apparatus 1 can connect between any input channel and any output channel.

The optical space switching apparatus which the present invention relates, comprises an existing optical space switch of splitter/combiner type where semiconductor laser amplifiers are used as optical gate switches. For example, such switch is disclosed in Yoshiharu Maeno et al "The Possibility of Optical Switching Technology for Parallel Processing Systems", IEICE, SB-9-5, 1996.

FIG. 2 illustrates an optical switch of splitter/combiner type known to the inventors. The illustrated optical space switch comprises zeroth through third input waveguides 20-0 through 20-3, zeroth through third beam splitters 21-0 through 21-3, zeroth through fifteenth optical gate switches 22-0 through 22-15, zeroth through third beam combiners 23-0 through 23-3, and zeroth through third output waveguides 24-0 through 24-3.

One kind of the existing optical gate switches is a semiconductor laser amplifier, which is turned Into a light-transmitting or an on state and a light absorbing or an off state when an electric current is fed thereto and is not fed thereto, respectively. For example, when the zeroth optical gate switch 22-0 turned into the on state, the zeroth input waveguide 20-0 is connected to the zeroth output waveguide 24-0.

The splitter/combiner type optical switch is strictly non-blocking and serves as a so-called crossbar switch where every pairs of input and output ports have dedicated connection paths. And accordingly, the optical space switching apparatus comprising the above switch also serves as a crossbar network. On the other hand, the optical switch of splitter/combiner type requires optical gate switches, (the number of ports)$^2$ in number, and therefore, has a fault that it is difficult to be implemented, as the number of ports becomes large.

FIG. 3 shows another optical space switching apparatus known to the inventors. The apparatus is applied a wavelength division multiplexing (WDM) technology thereto, and achieves to reduce the number of the optical gate switches as compared with the apparatus illustrated in FIG. 2. In this apparatus, zeroth through fifteenth input optical signal each having any one of zeroth through third wavelengths $\lambda 0$ through $\lambda 3$ are supplied from zeroth through fifteenth input ports 10-0 through 10-15 and combined by zeroth through third beam combiners 31-0 through 31-3.

In detail, when the zeroth through third input optical signals having zeroth through third wavelengths $\lambda 0$ through $\lambda 3$ are input to the zeroth beam combiner 31-0 from the zeroth through third input ports, the zeroth beam combiner 31-0 combines the zeroth through third input optical signals to produce a zeroth WDM optical signal. Likewise, the first beam combiner 31-1 combines the fourth through seventh input optical signals having zeroth through third wavelengths $\lambda 0$ through $\lambda 3$ to produce a first WDM optical signal. The second beam combiner 31-2 are input the eighth through eleventh input optical signals having zeroth thereto from third wavelengths $\lambda 0$ through $\lambda 3$ from the eighth through eleventh input ports, and then, combines the eighth through eleventh input optical signals to produce a second WDM optical signal. The third beam combiner 31-3 combines the twelfth through fifteenth input optical signals having zeroth through third wavelengths $\lambda 0$ through $\lambda 3$ to produce a third WDM optical signal.

The optical space switch 32 illustrated in FIG. 3 is of a 4×16 crossbar switch adapted to perform 1-to-4 multicasting at maximum. The illustrated switch 32 has zeroth through third input ports i0 through i3 to which the zeroth through third WDM optical signals are supplied and zeroth through fifteenth output ports o0 through o15 from which zeroth through fifteenth switched WDM optical signals are outputted. The zeroth through fifteenth output ports of the optical space switch 32 are connected to zeroth through fifteenth wavelength selectors 33A-0 through 33A-15, respectively. The zeroth through fifteenth wavelength selectors 33A-0 through 33A-15 select the optical signal of the desired wavelengths from the zeroth through fifteenth switched WDM optical signals outputted from the optical space switch 32 and produce zeroth through fifteenth selected optical signals. The zeroth through fifteenth wavelength selectors 33A-0 through 33A-15 are connected to zeroth through fifteenth output ports 11-0 through 11-15, respectively. The zeroth through fifteenth output ports 11-0 through 11-15 transmit the zeroth through fifteenth selected optical signals as zeroth through fifteenth output optical signals, respectively.

Thus, the optical space switching apparatus has a function of a 16×16 crossbar network. In the apparatus, the optical space switch 32 may be of splitter/combiner type described above, and may include sixty-four optical gate switches.

On the other hand, each of the existing wavelength selectors 33A (suffixes omitted) comprises optical gate switches, the number of which is equal to the number of wavelengths transmitted into each selector. In the example described above with FIG. 3, the number of wavelengths multiplexed into the switched WDM optical signal is equal to four, and therefore, the number of optical gate switches is also equal to four. Specifically, in each selector, a wavelength demultiplexer demultiplexes switched WDM optical signal into individual optical signals with different wavelengths and transmits the individual optical signals into the optical gate switches, respectively. And then, one of the gate switches corresponding to desired wavelength turns on while the others turn off so that only the optical signal with desired wavelength is outputted from the selector.

As understood from the above, the optical switching apparatus of space division type illustrated in FIG. 3 has 128 optical gate switches In total. On the other hand, another 16×16 apparatus consisting of a splitter/combiner type optical switch requires 256 optical gate switches. Thus, the number of optical gate switches which comprise the apparatus illustrated in FIG. 3 is reduced to 1/2 as compared with another apparatus consisting splitter/combiner type optical switch.

As against the above optical space switching, optical wavelength/space switching assigns channels to both of wavelengths and spaces. FIG. 4 shows another example of an optical wavelength/space switching apparatus. In the example, zeroth through third input channels are assigned to zeroth and first input ports 10-0 and 10-1 and zeroth and first wavelengths λ0 and λ1 of optical signals transmitting on each of input ports. On the other hand, zeroth through third output channels are assigned to zeroth and first output ports 11-0 and 11-1 and zeroth and first wavelengths λ0 and λ1 of optical signals transmitting on each of output ports. Such optical wavelength/space switching apparatus 2 can connect between any input channel and any output channel. As a related technique, an optical wavelength/space switching apparatus having small sized-hardware is disclosed in Japanese Unexamined Patent Publication No. Hei 3-219793, namely, JP-A 3-219793 and is incorporated herein by reference.

One type of such apparatuses known to the inventors is modified the optical space switching apparatus illustrated in FIG. 3. The optical wavelength/space switching apparatus known to the inventors has no beam combiners 31-0 through 31-3 as preliminarily processing of the optical space switch 32 and directly are input WDM optical signals to the input ports of the optical space switch through the input ports. Besides, the optical wavelength/space switching apparatus has, as latter stage of the wavelength selectors, wavelength converters corresponding to the wavelength selectors 33A-0 through 33A-15 and beam combiners.

Furthermore, related techniques are disclosed in Japanese Unexamined Patent Publications Nos. Hei 7-59127, Hei 1-109991, Hei 3-100526, and Hei 2-27892, namely, JP-A 7-59127, JP-A 1-109991, JP-A 3-100526, and JP-A 2-27892, respectively. These related techniques are incorporated herein by reference.

SUMMARY OF THE INVENTION

The present invention provides optical switching apparatuses improved in various aspects, such as the size of hardware and the performance thereof.

Research has been directed to relationship between the number of wavelength multiplexed into each WDM optical signal transmitted to the input port of optical space switch and the size of hardware, in particular, the number of optical gate switches. As a result of research, the inventors have found out one thing that the number of optical gate switches required by an optical switching apparatus is optimized if the number of WDM optical signals responding to the input ports of the optical space switch and the number of wavelengths of each WDM optical signal is equal to each other in particular optical switching apparatuses, such as illustrated in FIGS. 2 and 3. This is common to an optical switching apparatus of space division type and that of wavelength-division/space-division type.

However, the numbers of WDM optical signals and wavelengths depend on an environment to which the optical switching apparatus is adapted. And furthermore, it is getting things backwards to modify the environment which has already been defined into another environment which corresponds to the numbers of WDM optical signals and wavelength transmitted into the optical space switch. Thus, the numbers are restricted by the environment.

Therefore, the present invention provides the following method of delivering a plurality of WDM optical signals to a plurality of input ports of an optical space switch. The method comprises preliminarily processing the WDM optical signals in relation to the number of input ports of the optical space switch, by optically processing the WDN optical signals so that the number of processed WDM optical signals responding to the input ports and the processed number of wavelengths of each processed WDM optical signal is equal to each other.

Herein, the numbers of the Input ports, the processed number of wavelength, the WDM optical signals, the wavelengths multiplexed in each of the WDM optical signals are equal to K, J, N, and M, respectively, where K, J, N, and M are integers not less than two. Furthermore, the above method may comprise using the optical space switch which further has K*M*N optical gate switches and which is connected to M*N wavelength selectors each comprising M*N/K additional optical gate switches, after the preliminarily processing.

The above method may comprise preliminarily processing the WDM optical signals in relation to the number of input ports of the optical space switch, by optically processing the WDM optical signals so that M*N is equal to J*K.

According to one aspect of the present invention, in case where M is larger than N, the preliminary process comprises, responsive to N WDM optical signals each of which has M multiplexed wavelengths., carrying out wavelength routing for the N WDM optical signals to produce K routed WDM optical signals as the K input WDM optical signals, each of which has J(=M*N/K) multiplexed wavelengths.

According to another aspect of the present invention, in case where M is smaller than N, the preliminary process comprises three processes: responsive to N WDM optical signals each of which has M multiplexed wavelengths, grouping N WDM optical signals into K sub-groups which comprises N/K WDM optical signals; carrying out optical wavelength shifting for (N−K) ones of N WDM optical signals to make wavelengths of the (N−K) WDM optical signals different from each other at each K sub-group; and then carrying out wavelength division multiplexing for the (N−K) WDM optical signals subjected to the shifting and K WDM optical signals not subjected to the shifting at each K sub-group to produce, as the K input WDM optical signals, K additional WDM optical signals each of which has J(=M*N/K) multiplexed wavelengths.

The present invention further provides an optical switching apparatus which comprises an optical converter, an optical space switch, and wavelength selectors, as the followings. Responsive to N WDM optical signals each of which has M multiplexed wavelengths, the optical converter converts the N WDM optical signals into K input WDM optical signals each of which has J multiplexed wavelengths, wherein all of N, M, K and J are integers not less than two and J*K is equal to M*N. The optical space switch comprises K input ports and M*N output ports. The optical space switch responds to K input WDM optical signals to produce M*N switched WDM optical signals through the M*N output ports. The wavelength selectors is M*N. Responsive to the M*N switched WDM optical signals, respectively, the wavelength selectors selects one of J wavelengths multiplexed into the responding switched WDM optical signal.

DESCRIPTION OF THE PREFERRED EMBODIMENTS

Figure 1:
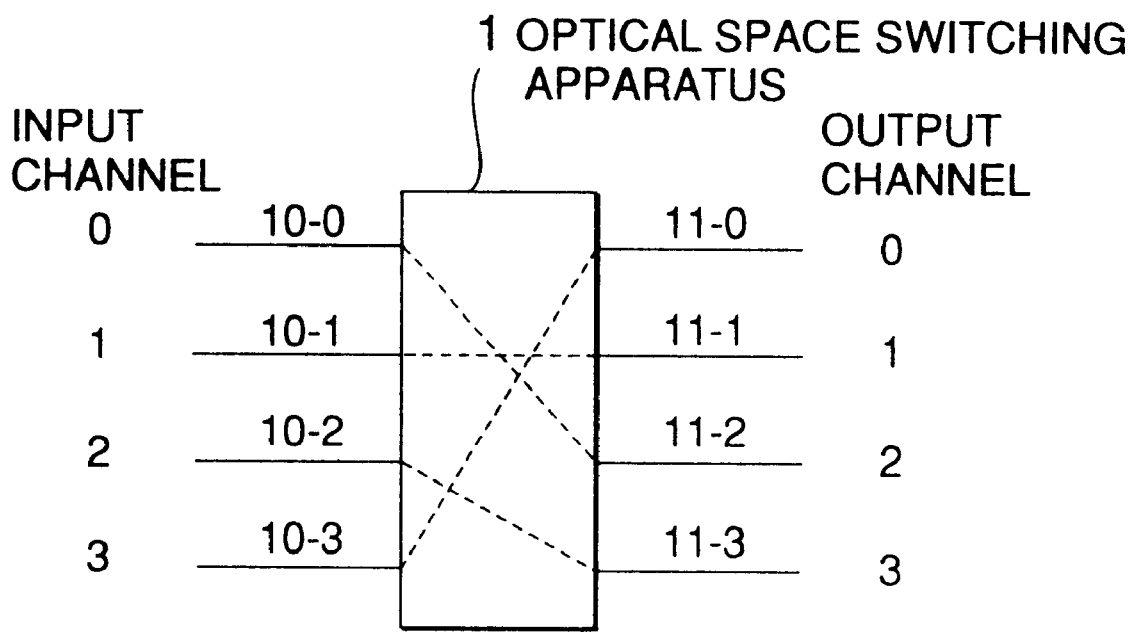
FIG. 1 shows a block diagram of an example of an optical switching apparatus of space division type.
Figure 2:
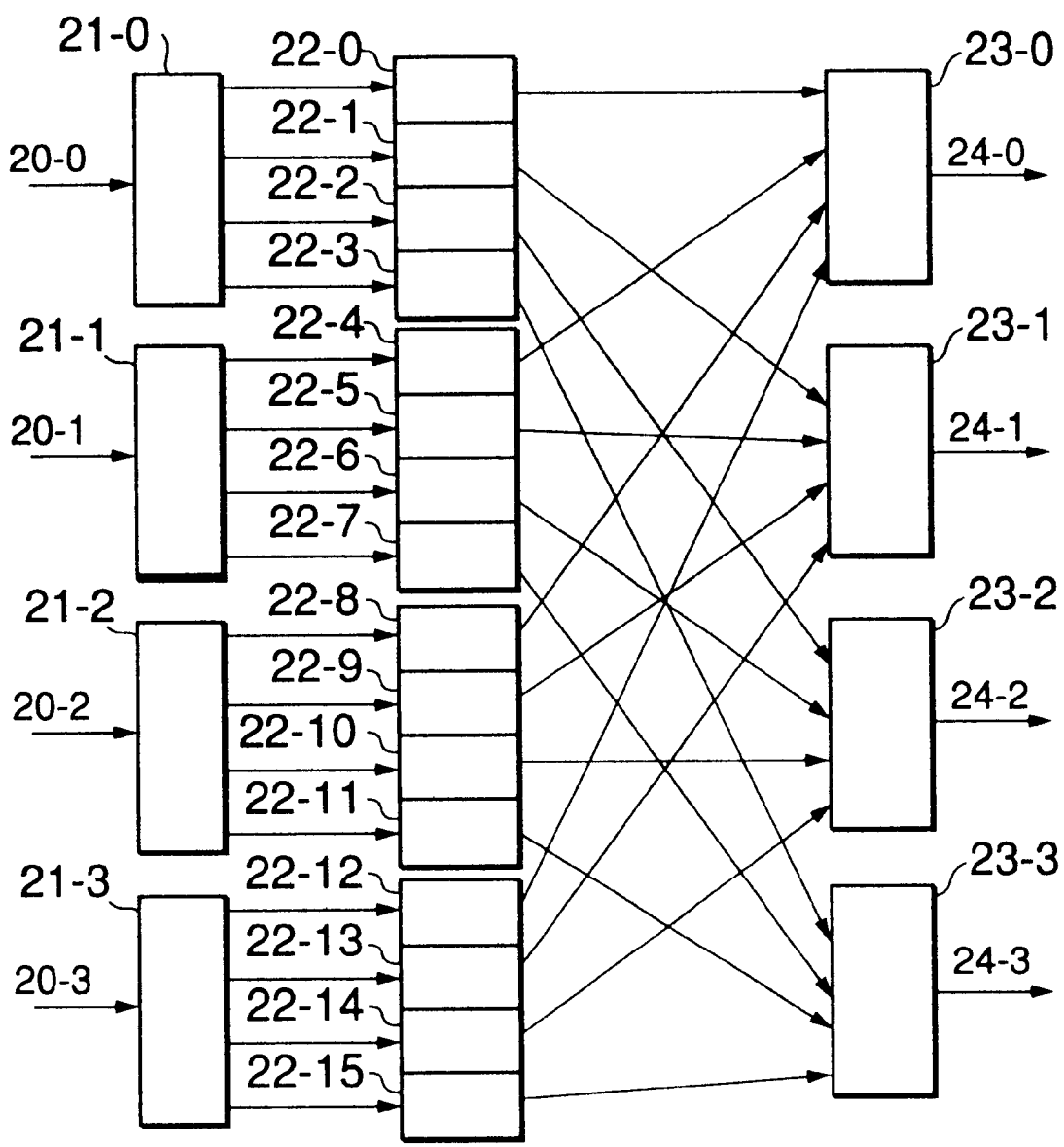
FIG. 2 shows an existing optical space switch of splitter/combiner type.
Figure 3:
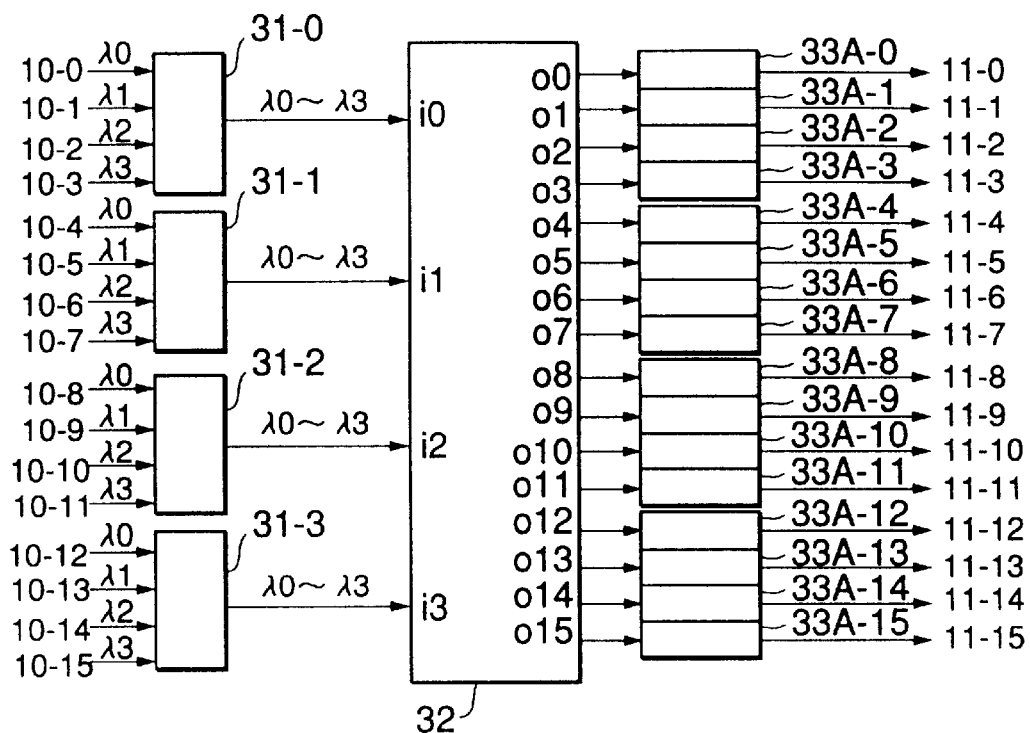
FIG. 3 shows a related optical space switching apparatus known to the inventors.
Figure 4:
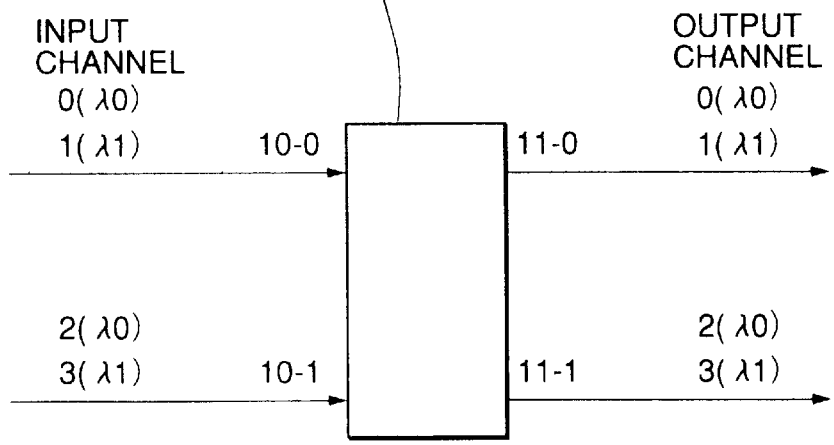
FIG. 4 shows a block diagram of an example of an optical switching apparatus of wavelength-division/space-division type.

Now, several preferred embodiments of this invention will be described in detail with reference to the drawing.

Figure 5:
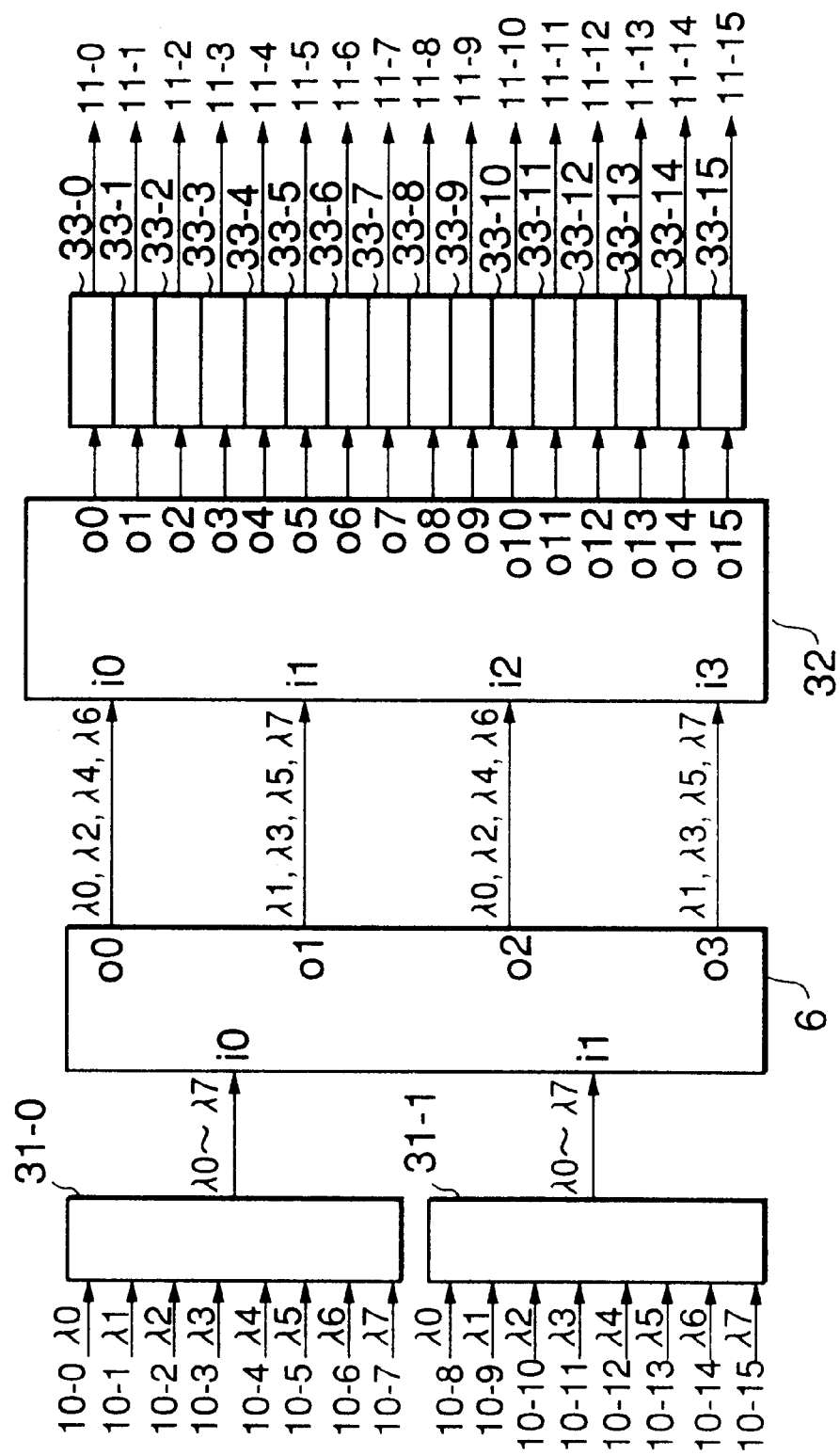
FIG. 5 illustrates an optical switching apparatus according to a first embodiment of the invention.
Figure 6A:
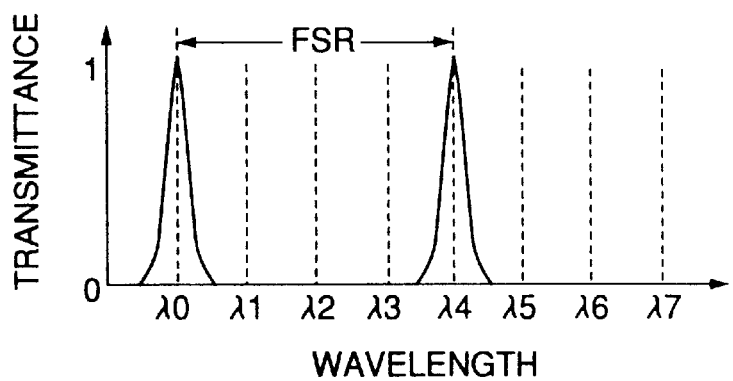
FIGS. 6A through 6D show transmission characteristics of a wavelength router which may be used in the apparatus illustrated In FIG. 5.
Figure 6B:
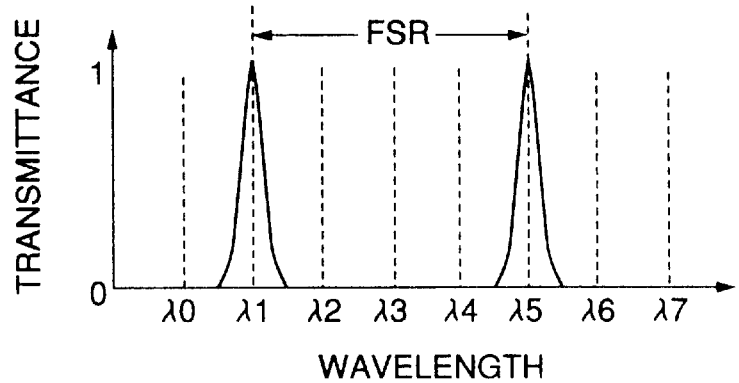
Figure 6C:
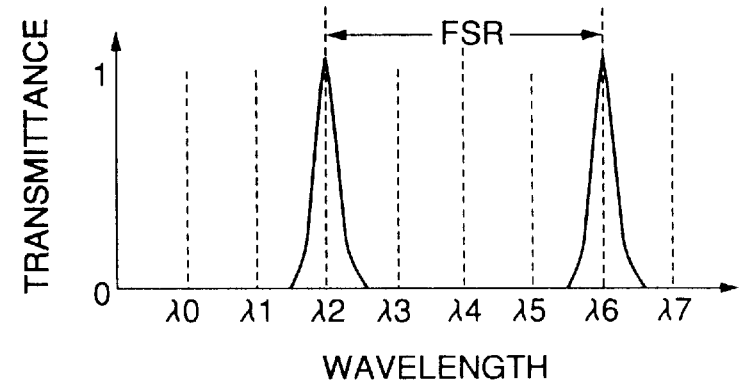
Figure 6D:
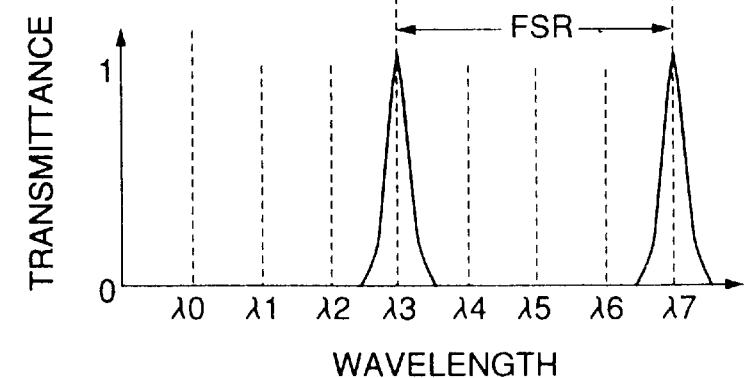

Referring to FIG. 5, an optical switching apparatus (or an optical exchange) according to a first embodiment of this invention will be described. The optical switching apparatus illustrated in the figure is of a 16×16 space division type where M=8, N=2, K=4 and J=4. That is, M and N are not equal to J and K, respectively.

Zeroth through seventh input optical signals having zeroth through seventh wavelengths $\lambda 0$ through $\lambda 7$ are supplied from zeroth through seventh input ports 10-0 through 10-7, respectively and combined (or multiplexed) by a zeroth beam combiner (or optical multiplexer) 31-0 into a WDM optical signal to be supplied to a zeroth input port i0 of a wavelength router 6. Likewise, eighth through fifteenth input optical signals having zeroth through seventh wavelengths $\lambda 0$ through $\lambda 7$ are supplied from eighth through fifteenth input ports 10-8 through 10-15, respectively, and combined by a first beam combiner 31-1 into a WDM optical signal to be supplied to a first input port i1 of the wavelength router 6.

The wavelength router 6 may be implemented by an silica arrayed-waveguide grating formed on a silicon substrate. For example, such router is disclosed in Hiroshi Takahashi et al "Wavelength Multiplexer Based on $SiO_2$—$Ta_2O_5$ Arrayed-Waveguide Grating", Journal of Lightwave Technology, Vol. 12, No. 6, June 1994.

Referring to FIGS. 6A through 6D, transmission characteristics of the wavelength router 6 are illustrated as the relationship between the wavelengths of the optical signals and the transmittance. The optical signals have a wavelength channel spacing of 0.8 nm. The wavelength router 6 has a wavelength channel spacing and a free spectral range (FSR) equal to 0.8 nm and 3.2 nm, respectively. Thus, the FSR exactly corresponds to four times the wavelength channel spacing. In this event, the optical signals having the zeroth and the fourth wavelengths $\lambda 0$ and $\lambda 4$ are transmitted from the zeroth input port i0 to a zeroth output o0. Likewise, the optical signals having the first and the fifth wavelengths $\lambda 1$ and $\lambda 5$ are transmitted from the zeroth input port i0 to a first output port o1. On the other hand, from the first input port i1 to the zeroth output port o0, the optical signals having the second and the sixth wavelengths $\lambda 2$ and $\lambda 6$ are transmitted. From the first input port i1 to the first output port o1, the optical signals having the third and the seventh wavelengths $\lambda 3$ and $\lambda 7$ are transmitted.

The above-mentioned characteristics are easily achieved by differing the interval of input waveguides of the arrayed-waveguide grating from that of the output waveguides. From the above, the relationship between the input and the output ports of the wavelength router 6 and the transmitted wavelengths is tabulated in Table 1.

TABLE 1

|  |  | Output | | | |
|---|---|---|---|---|---|
|  |  | o0 | o1 | o2 | O3 |
| input | i0 | $\lambda 0, \lambda 4$ | $\lambda 1, \lambda 5$ | $\lambda 2, \lambda 6$ | $\lambda 3, \lambda 7$ |
|  | i1 | $\lambda 2, \lambda 6$ | $\lambda 3, \lambda 7$ | $\lambda 0, \lambda 4$ | $\lambda 1, \lambda 5$ |

From Table 1, it will be understood that, when the WDM optical signal including the zeroth through the seventh wavelengths $\lambda 0$ through $\lambda 7$ is supplied through each of the zeroth and the first input ports i0 and i1, a WDM optical signal including the zeroth, the second, the fourth, and the sixth wavelengths $\lambda 0, \lambda 2, \lambda 4,$ and $\lambda 6$ (hereinafter referred to as a wavelength group A) is produced from each of the zeroth and the second output ports o0 and o2. In addition, another WDM optical signal including the first, the third, the fifth, and the seventh wavelengths $\lambda 1, \lambda 3, \lambda 5,$ and $\lambda 7$ (hereinafter referred to as a wavelength group B) is produced from each of the first and the third output ports o1 and o3.

The WDM optical signals having the wavelength groups A and B are delivered from the wavelength router 6 to an optical space switch (or an optical space division switch) 32. The optical space switch 32 of this embodiment is a 4×16 optical crossbar switch adapted to perform 1-to-16 multicasting at maximum, and has zeroth through third input ports i0 through i3 and zeroth through fifteenth output ports o0 through o15. The optical space switch 32 directs the WDM optical signal supplied through each input port to a desired output port. Herein, arbitration control is carried out so that those WDM optical signals supplied through different input ports are not outputted from a common output port.

Figure 7:
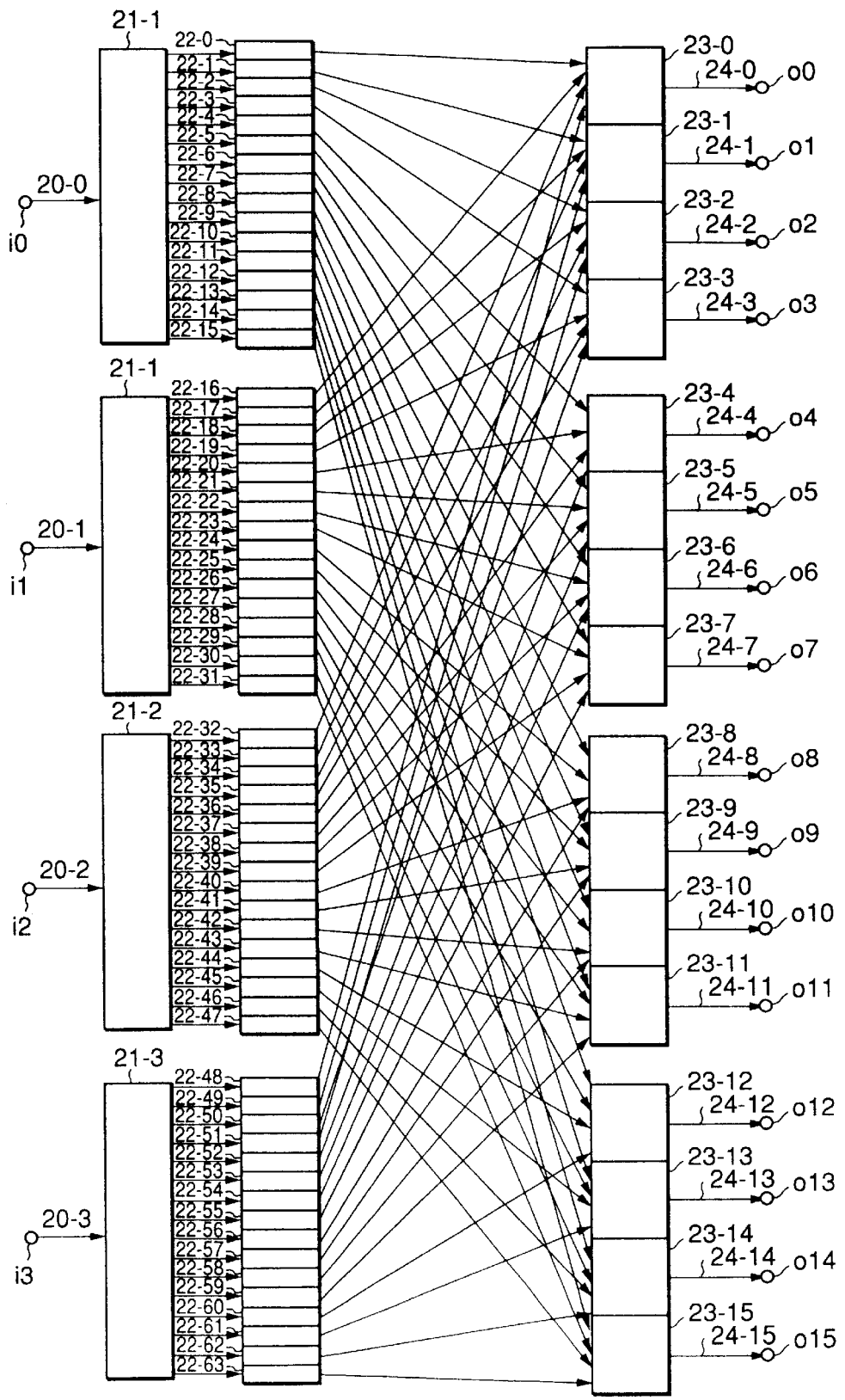
FIG. 7 shows another optical space switch adaptable to the apparatus illustrated in FIG. 5.

The optical space switch 32 according to the embodiment is of splitter/combiner type illustrated in FIG. 7 and comprises zeroth through third input waveguides 20-0 through 20-3, zeroth through third beam splitters 21-0 through 21-3, zeroth through fifteenth beam combiners 23-0 through 23-15, and zeroth through fifteenth output waveguides 24-0 through 24-15, zeroth through sixty-third optical gate switches or semiconductor laser amplifiers 22-0 through 22-63. In this embodiment, the input waveguides, beam splitters, beam combiners, and output waveguides are all formed on a common silicon substrate while the optical gate switches are mounted on the substrate. Each of the optical gate switches 22 (suffixes omitted) is turned into a light-transmitting or an on state and a light-absorbing or an off state when an electric current is supplied and is not supplied, respectively. By turning on and off the optical gate switches 22 (suffixes omitted), a crossbar switch function is achieved.

Zeroth through fifteenth switched WDM optical signals produced from the optical space switch 32 are supplied to zeroth through fifteenth wavelength selectors 33-0 through 33-15, respectively, as illustrated in FIG. 5.

Figure 8:
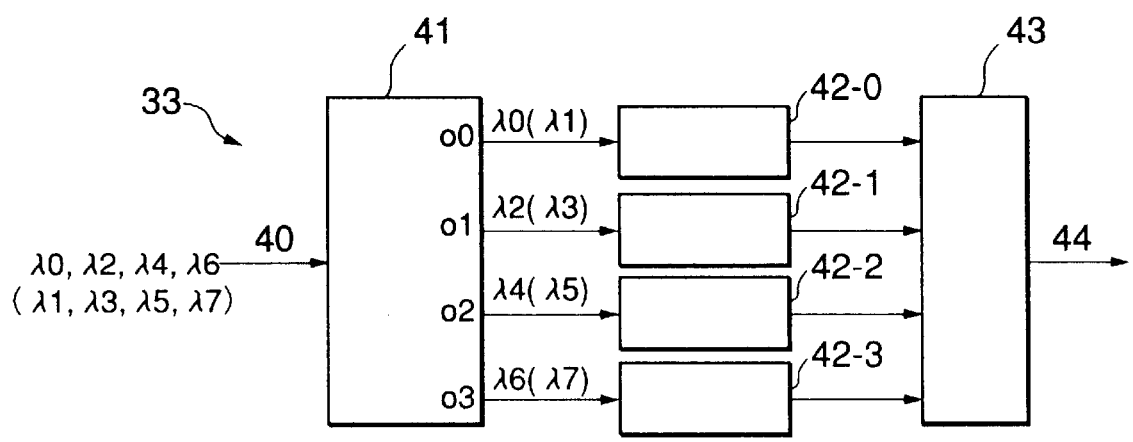
FIG. 8 shows a wavelength selector adaptable to the apparatus of the preferable embodiment.

Referring to FIG. 8, each of the wavelength selectors 33 (suffixes omitted) comprises an input waveguide 40, a wavelength demultiplexer 41 of an arrayed-waveguide grating type, a beam combiner 43, an output waveguide 44, and zeroth through third optical gate switches 42-0 through 42-3 as semiconductor laser amplifiers. In this embodiment, the input waveguide, wavelength demultiplexer, beam combiner, and output waveguide are all formed on a common silicon substrate while the optical gate switches are mounted on the substrate. Each wavelength selector 33 serves as a 4×1 wavelength selector for selecting and outputting a desired one of four wavelengths.

The switched WDM optical signal having the zeroth, the second, the fourth, and the sixth wavelengths (or the first, the third, the fifth, and the seventh wavelengths) $\lambda 0$, $\lambda 2$, $\lambda 4$, and $\lambda 6$ (or $\lambda 1$, $\lambda 3$, $\lambda 5$, and $\lambda 7$) is supplied to an input port i0 of the wavelength demultiplexer 41. The wavelength demultiplexer 41 demultiplexes the switched WDM optical signal into individual wavelengths to produce an optical signal having the zeroth (or the first) wavelength $\lambda 0$ (or $\lambda 1$) through a zeroth output port o0, an optical signal having the second (or the third) wavelength $\lambda 2$ (or $\lambda 3$) through a first output port o1, an optical signal having the fourth (or the fifth) wavelength $\lambda 4$ (or $\lambda 5$) through a second output port o2, and an optical signal having the sixth (or the seventh) wavelength $\lambda 6$ (or $\lambda 7$) through a third output port o3. As described above, the optical space switch 32 carries out arbitration control so that the WDM optical signals having the wavelength groups A and B are not simultaneously supplied to any single wavelength selector 33. Therefore, one of the wavelength groups A and B is supplied through the input port i0 and each of the four output ports produces an optical signal of a single wavelength to be delivered to a corresponding one of the optical gate switches 42 (suffixes omitted). One of the optical gate switches 42 (suffixes omitted) which is supplied with a desired wavelength is turned on while the others are turned off. Thus, the optical signal of the desired wavelength is selected from the four wavelengths and passes through the beam combiner 43 to be delivered through the output waveguide 44.

Zeroth through fifteenth selected optical signals produced from the zeroth through the fifteenth wavelength selectors 33-0 through 33-15 are delivered to zeroth through fifteenth output ports 11-0 through 11-15, respectively, as illustrated in FIG. 5.

By collective switching of the WDM optical signals and multicasting by the optical space switch 32 and wavelength selection by the wavelength selectors 33 (suffixes omitted), the optical switching apparatus of space division type has a function of 16×16 crossbar network.

For example, consideration will be made about the case where connection between the zeroth input port 10-0 and the zeroth output port 11-0 and connection between the tenth input port 10-10 and the first output port 11-1 are simultaneously carried out. In this event, the optical signal having the zeroth wavelength $\lambda 0$ and supplied from the zeroth input port 10-0 passes through the beam combiner 31-0 and then through the wavelength router 6 (from the zeroth input port i0 to the zeroth output port o0) to be supplied to the zeroth input port i0 of the optical space switch 32. On the other hand, the optical signal of the second wavelength $\lambda 2$ supplied from the tenth input port 10-10 passes through the beam combiner 31-1 and then through the wavelength router 6 (from the first input port i1 to the zeroth output port o0) to be supplied to the zeroth input port i0 of the optical space switch 32. The optical space switch 32 multicasts to the zeroth and the first output ports o0 and o1 the WDM optical signal having the zeroth and the second wavelengths $\lambda 0$ and $\lambda 2$ supplied from the zeroth input port i0. The zeroth wavelength selector 33-0 selects the zeroth wavelength $\lambda 0$ for delivery to the zeroth output port 11-0. The first wavelength selector 33-1 selects the second wavelength $\lambda 2$ for delivery to the first output port 11-1. In the above-mentioned manner, the connection from the zeroth input port 10-0 to the zeroth output port 11-0 and the connection from the tenth input port 10-10 to the first output port 11-1 are simultaneously carried out.

In the first embodiment described above, the wavelength router 6 serves as an optical converter to reduce the number of multiplexed wavelengths. Specifically, at the input of the wavelength router 6, the number of multiplexed wavelengths is equal to 8 while the number of multiplexed spaces is equal to 2. Since the WDM optical signals of the wavelength group A produced from the zeroth and the second output ports o0 and o2 of the wavelength router 6 are different in wavelength from the WDM optical signals of the wavelength group B produced from the first and the third output ports o1 and o3, the number of wavelengths used in the whole apparatus is equal to 8 in total. However, the number of multiplexed wavelengths on a single route is equal to 4 at maximum and the wavelength selectors 33 (suffixes omitted) similarly operate for both of the wavelength groups. Therefore, the number of multiplexed wavelengths is reduced to 4.

Such reduction in number of the multiplexed wavelengths provides the following two advantages. First, the number of the optical gate switches required in the apparatus is reduced. If the wavelength router 6 is not provided, the optical space switch 32 is of a 2×16 type while the wavelength selectors 33 is of a 8×1 type. Therefore, the number of the optical gate switches 22 required in the optical space switch 32 is equal to 32. The number of the optical gate switches 42 required per each wavelength selector 33 is equal to 8. Thus, the optical switching apparatus requires 160 optical gate switches in total. On the other hand, in this embodiment, the optical space switch 32 requires 64 optical gate switches while each wavelength selector 33 requires 4 optical gate switches. Thus, the optical switching apparatus according to this embodiment requires 128 optical gate switches in total. Thus, the number is reduced to 4/5 as compared with the case where the wavelength router 6 is not provided.

Second, the number of multiplexed wavelengths of the WDM optical signal supplied to the optical gate switch 22 of the optical space switch 32 is reduced so that the optical gate switch 22 as the semiconductor laser amplifier is hardly saturated. In absence of the wavelength router 6, eight wavelengths are supplied to the optical gate switch 22 at maximum. On the contrary, in this embodiment, four wavelengths are supplied at maximum. Thus, a light intensity (or an optical signal intensity) for each wavelength can be increased to twice as compared with the case where the wavelength router 6 is not provided. Therefore, a light intensity of the optical signal delivered to the output port 11 (suffixes omitted) is increased to twice also.

Figure 9:
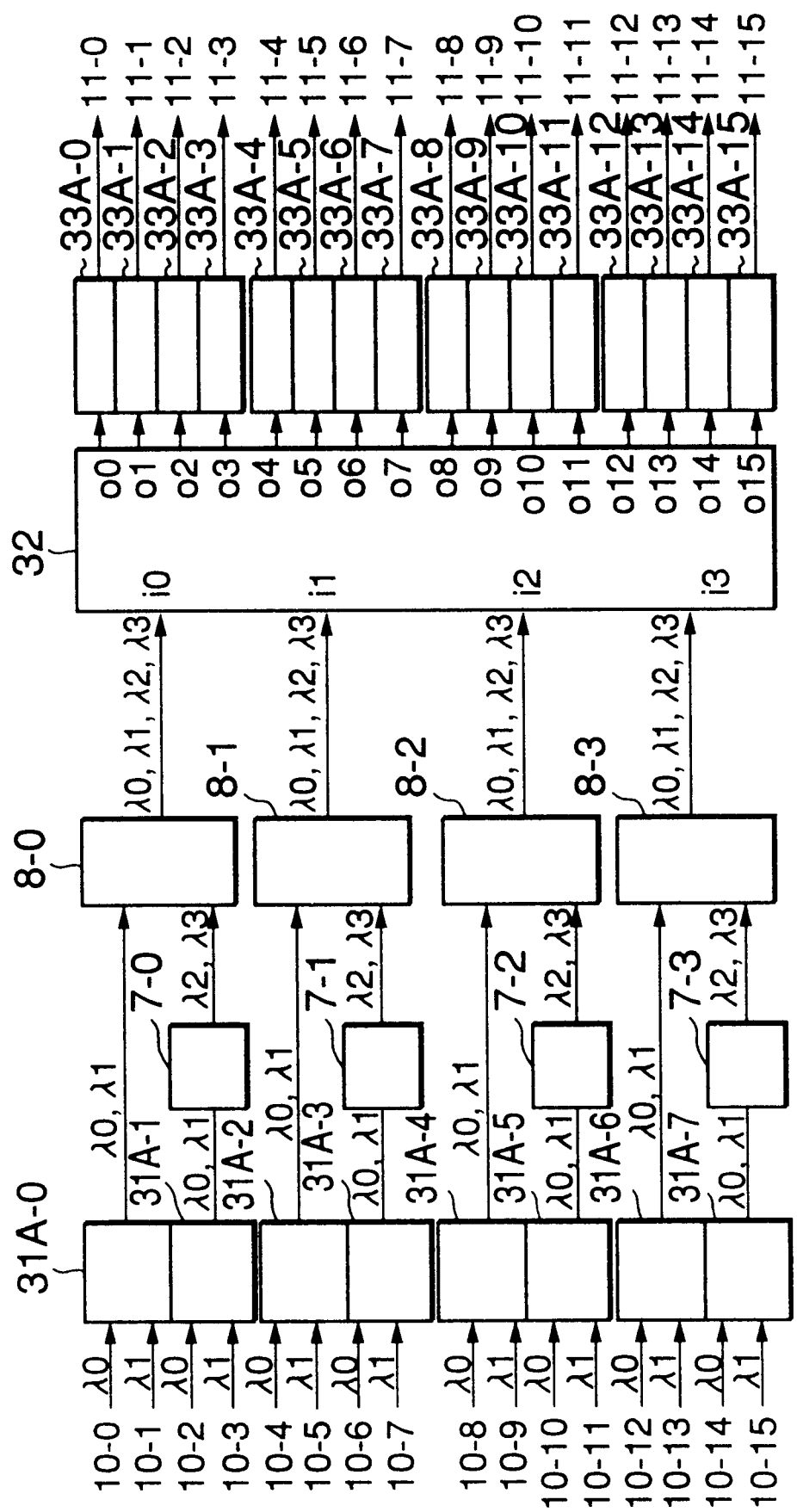
FIG. 9 illustrates an optical switching apparatus according to a second embodiment of the invention.

Referring to FIG. 9, an optical switching apparatus according to a second embodiment of this invention is of a 16*16 space division type where M=2, N=8, K=4, and J=4. That is, M and N are not equal to J and K, respectively.

The zeroth through the fifteenth input optical signals are supplied through the zeroth through the fifteenth input ports 10-0 through 10-15, respectively. Herein, each of the zeroth, the second, the fourth, the sixth, the eighth, the tenth, the twelfth, and the fourteenth input optical signals has the zeroth wavelength $\lambda 0$ while each of the first, the third, the fifth, the seventh, the ninth, the eleventh, the thirteenth, and the fifteenth input optical signals has the first wavelength $\lambda 1$.

The zeroth and the first input optical signals are supplied to a zeroth primary-stage beam combiner 31A-0. The second and the third input optical signals are supplied to a first primary-stage beam combiner 31A-1. The fourth and the fifth input optical signals are supplied to a second primary-stage beam combiner 31A-2. The sixth and the seventh input optical signals are supplied to a third primary-stage beam combiner 31A-3. The eighth and the ninth input optical signals are supplied to a fourth primary-stage beam combiner 31A-4. The tenth and the eleventh input optical signals are supplied to a fifth primary-stage beam combiner 31A-5. The twelfth and the thirteenth input optical signals are supplied to a sixth primary-stage beam combiner 31A-6. The fourteenth and the fifteenth input optical signals are supplied to a seventh primary-stage beam combiner 31A-7. Each of the first through the seventh primary-stage beam combiners 31A-0 through 31A-7 combines two input optical signals supplied thereto to produce a WDM optical signal of two wavelengths. Specifically, the zeroth through the seventh primary-stage beam combiners 31A-0 through 31A-7 produce zeroth through seventh primary-stage WDM optical signals, respectively.

Among the zeroth through the seventh primary-stage WDM optical signals, the first, the third, the fifth, and the seventh primary-stage WDM optical signals are supplied to zeroth through third wavelength shifters 7-0 through 7-3, respectively. Each of the zeroth through the third wavelength shifters 7-0 through 7-3 wavelength-shifts the zeroth and the first wavelengths $\lambda 0$ and $\lambda 1$ of the primary-stage WDM optical signal supplied thereto into a WDM optical signal of the second and the third wavelengths $\lambda 2$ and $\lambda 3$. Specifically, the zeroth wavelength shifter 7-0 wavelength-shifts the first primary-stage WDM optical signal to produce a zeroth wavelength-shifted WDM optical signal. The first wavelength shifter 7-1 wavelength-shifts the third primary-stage WDM optical signal to produce a first wavelength-shifted WDM optical signal. The second wavelength shifter 7-2 wavelength shifts the fifth primary-stage WDM optical signal to produce a second wavelength-shifted WDM optical signal. The third wavelength shifter 7-3 wavelength-shifts the seventh primary-stage WDM optical signal to produce a third wavelength-shifted WDM optical signal.

For example, each of the zeroth through the third wavelength shifters 7-0 through 7-3 comprises a wavelength shifter using four-wave-mixing (FWM) in the semiconductor laser amplifier (SLA). Such wavelength shifter is disclosed, for example, in R. Schnabel et al, "Polarization Insensitive Frequency Conversion of a 10-channel OFDM Signal Over 275 GHz in a Semiconductor Laser Amplifier", Proceeding of 19th European Conference on Optical Communication, Vol. 13, ThP 12.4, September 1993.

Figure 10:
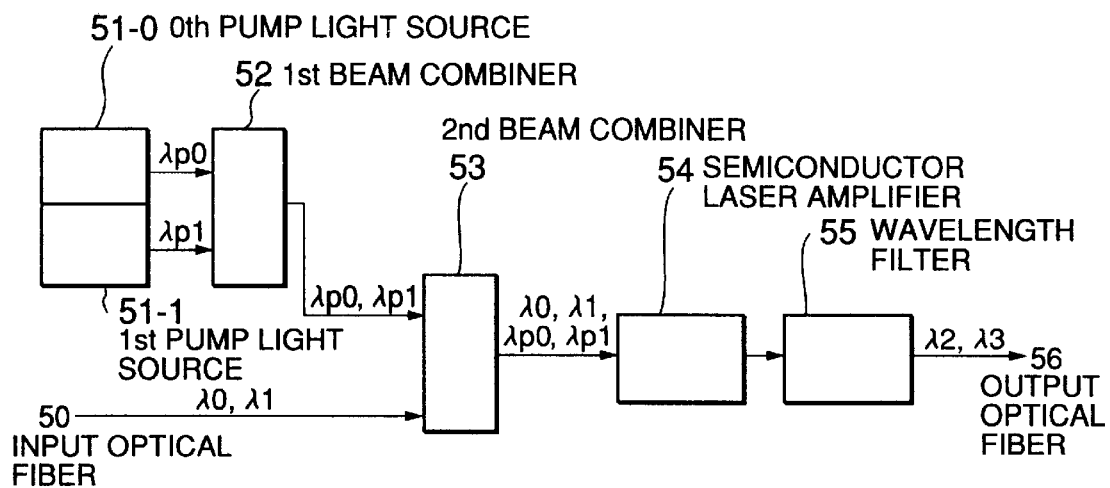
FIG. 10 shows a wavelength shifter adaptable to the apparatus illustrated in FIG. 9.

Referring to FIG. 10, the wavelength shifter 7 (suffixes omitted) according to this embodiment comprises an input optical fiber 50, zeroth and first pump light sources 51-0 and 51-1, first and second beam combiners 52 and 53, a semiconductor laser amplifier 54, a wavelength filter 55, and an output optical fiber 56.

Each of the zeroth and the first pump light sources 51-0 and 51-1 comprises a semiconductor laser. The zeroth pump light source 51-0 produces a zeroth pump light having a zeroth pump wavelength $\lambda p0$ while the first pump light source 51-1 produces a first pump light having a first pump wavelength $\lambda p1$. The zeroth and the first pump lights are combined by the first beam combiner 52 to produce a combined pump light having the zeroth and the first pump wavelengths $\lambda p0$ and $\lambda p1$. The combined pump light is supplied to the second beam combiner 53. The second beam combiner 53 is also supplied from the input optical fiber 50 with the primary-stage WDM optical signal having the zeroth and the first wavelengths $\lambda 0$ and $\lambda 1$.

Specifically, the second beam combiner 53 is supplied on one hand with the primary-stage WDM optical signal supplied through the input optical fiber 50 and having the zeroth and the first wavelength $\lambda 0$ and $\lambda 1$ and on the other hand with the combined pump light having the zeroth and the first pump wavelengths $\lambda p0$ and $\lambda p1$ produced from the zeroth and the first pump light sources 51-0 and 51-1 as semiconductor lasers. The second beam combiner 53 combines the primary-stage WDM optical signal and the combined pump light to produce a WDM optical signal, having the zeroth and the first wavelengths $\lambda 0$ and $\lambda 1$ and the zeroth and the first pump wavelengths $\lambda p0$ and $\lambda p1$.

The WDM optical signal produced by the second beam combiner 53 is supplied to the semiconductor laser amplifier 54. Since four-wave-mixing occurs within the semiconductor laser amplifier 54, a wavelength-shifted WDM optical signal is newly produced which are wavelength-shifted from the zeroth and the first wavelengths $\lambda 0$ and $\lambda 1$ to the second and the third wavelengths $\lambda 2$ and $\lambda 3$ shifted by $\Delta \lambda$ (where $\Delta \lambda = |\lambda p1 - \lambda p0|$). Specifically, the semiconductor laser amplifier 54 produces the WDM optical signal having the zeroth through the third wavelengths $\lambda 0$, $\lambda 1$, $\lambda 2$, and $\lambda 3$ and the zeroth and the first pump wavelengths $\lambda p0$ and $\lambda p1$. The WDM optical signal is supplied to the wavelength filter 55. The wavelength filter 55 transmits the second and the third wavelengths $\lambda 2$ and $\lambda 3$ of the WDM optical signal among the six wavelengths $\lambda 0$, $\lambda 1$, $\lambda 2$, $\lambda 3$, $\lambda p0$, and $\lambda p1$ to produce a wavelength-shifted WDM optical signal which is delivered to the output optical fiber 56.

Turning to FIG. 9, the zeroth through the third wavelength-shifted WDM optical signals are supplied to zeroth through third secondary-stage beam combiners 8-0 through 8-3, respectively. The zeroth through the third secondary-stage beam combiners 8-0 through 8-3 are supplied with the zeroth, the second, the fourth, and the sixth primary-stage WDM optical signals produced by the zeroth, the second, the fourth, and the sixth primary-stage beam combiners 31-0, 31-2, 31-4, and 31-6 and having the zeroth and the first wavelengths $\lambda 0$ and $\lambda 1$. The zeroth secondary-stage beam combiner 8-0 combines the zeroth primary-stage WDM optical signal and the zeroth wavelength-shifted WDM optical signal to produce a zeroth secondary-stage WDM optical signal having the zeroth through the third wavelengths $\lambda 0$ through $\lambda 3$. Likewise, the first secondary-stage beam combiner 8-1 combines the second primary-stage WDM optical signal and the first wavelength-shifted WDM optical signal to produce a first secondary-stage WDM optical signal having the zeroth through the third wavelengths λ0 through λ3. The second secondary-stage beam combiner 8-2 combines the fourth primary-stage WDM optical signal and the second wavelength-shifted WDM optical signal to produce a second secondary-stage WDM optical signal having the zeroth through the third wavelengths λ0 through λ3. The third secondary-stage beam combiner 8-3 combines the sixth primary-stage WDM optical signal and the third wavelength-shifted WDM optical signal to produce a third secondary-stage WDM optical signal having the zeroth through the third wavelengths λ0 through λ3. The zeroth through the third secondary-stage WDM optical signals are supplied to the optical space switch 32.

The optical space switch 32 illustrated in the figure is adapted to perform 1-to-16 multicasting at maximum and has the zeroth through the third input ports i0 through i3 and the zeroth through the fifteenth output ports o0 through o15. The optical space switch 32 directs the secondary-stage WDM optical signal supplied through each input port to a desired output port. Herein, arbitration control is carried out so that those WDM optical signals supplied through different input ports are not outputted from any common output port. The optical space switch 32 in this embodiment is similar in structure and operation to that of the first embodiment and will not be described any longer. The optical space switch 32 delivers the zeroth through the fifteenth switched WDM optical signals through the zeroth through the fifteenth output ports, respectively.

The zeroth through the fifteenth switched WDM optical signals produced by the optical space switch 32 are supplied to the zeroth through the fifteenth wavelength selectors 33A-0 through 33A-15, respectively.

Figure 11:
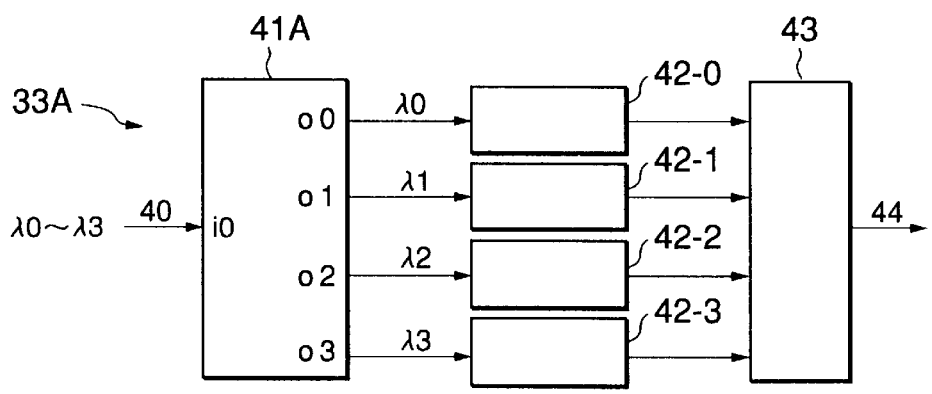
FIG. 11 shows a wavelength selector capable of applying to the apparatus illustrated in FIG. 9.

Referring to FIG. 11, each of the wavelength selectors 33A (suffixes omitted) comprises the input waveguide 40, a wavelength demultiplexer 41A of an arrayed-waveguide grating type, the beam combiner 43, the output waveguide 44, and the first through the third optical gate switches 42-0 through 42-3 as semiconductor laser amplifiers. In this embodiment, the input waveguide, wavelength demultiplexer, beam combiners, and output waveguide are all formed on a common silicon substrate while the optical gate switches are mounted on the substrate. The wavelength selector 33A serves as a 4×1 wavelength selector for selecting and outputting a desired one of four wavelengths.

A switched WDM optical signal having the zeroth through the third wavelengths λ0 through λ3 is supplied from the input waveguide 40 to an input port i0 of the wavelength demultiplexer 41A. The wavelength demultiplexer 41A demultiplexes the switched WDM optical signal into individual wavelengths to produce optical signals of the zeroth wavelength λ0, the first wavelength λ1, the second wavelength λ2, and the third wavelength λ3 through zeroth through third output ports o0 through o3, respectively. One of the optical gate switches 42 (suffixes omitted) which is supplied with the desired wavelength is turned on while the others are turned off. Thus, the optical signal of the desired wavelength is selected from the four wavelengths and sent through the beam combiner 43 to be outputted from the output waveguide 44.

Turning to FIG. 9, the zeroth through the fifteenth wavelength selectors 33A-0 through 33A-15 select the optical signals of the desired wavelengths from the zeroth through the fifteenth switched WDM optical signals and produce zeroth through fifteenth selected optical signals.

The zeroth through the fifteenth selected optical signals produced by the zeroth through the fifteenth wavelength selectors 33A-0 through 33A-15 are delivered to zeroth through fifteenth output ports 11-0 through 11-15, respectively.

By collective switching of the WDM optical signals and multicasting by the optical space switch 32 and wavelength selection by the wavelength selectors 33A (suffixes omitted), the optical switching apparatus of space division type has a function of a 16×16 crossbar network.

For example, it is assumed that connection between the zeroth input port 10-0 and the zeroth output port 11-0 and connection between the second input port 10-2 and the first output port 11-1 are simultaneously carried out. In this event, the zeroth input optical signal having the zeroth wavelength λ0 and supplied through the zeroth input port 10-0 is sent through the zeroth primary-stage beam combiner 31A-0 and the zeroth secondary-stage beam combiner 8-0 to be supplied to the zeroth input port i0 of the optical space switch 32. On the other hand, the second input optical signal having the zeroth wavelength λ0 and supplied from the second input port 10-2 is sent through the first primary-stage beam combiner 31A-1 to the zeroth wavelength shifter 7-0 to be wavelength-shifted into the second wavelength λ2 which is sent through the zeroth secondary-stage beam combiner 8-0 to be supplied to the zeroth input port 10 of the optical space switch 32. The optical space switch 32 multicasts to the zeroth and the first output ports o0 and o1 the WDM optical signal having the zeroth and the second wavelengths λ0 and λ2 and supplied through the zeroth input port i0. The zeroth wavelength selector 33A-0 selects the zeroth wavelength λ0 for delivery to the zeroth output port 11-0. The first wavelength selector 33A-1 selects the second wavelength λ2 for delivery to the first output port 11-1. In the above-mentioned manner, the connection from the zeroth input port 10-0 to the zeroth output port 11-0 and the connection from the tenth input port 10-10 to the first output port 11-1 are simultaneously achieved.

In the second embodiment, the wavelength shifters 7 (suffixes omitted) and the secondary-stage beam combiners 8 (suffixes omitted) serve as another optical converter to increase the number of multiplexed wavelengths. Specifically, at the output of the primary-stage beam combiners 31 (suffixes omitted), the number of multiplexed wavelengths and the number of multiplexed spaces are equal to two and eight, respectively. On the other hand, at the output of the secondary-stage beam combiners 8 (suffixes omitted), the number of multiplexed wavelengths and the number of multiplexed spaces are equal to four and four, respectively.

Because of increase in number of the multiplexed wavelengths, the number of the optical gate switches required in the apparatus is reduced. In absence of the wavelength shifters 7 (suffixes omitted) and the secondary-stage beam combiners 8 (suffixes omitted), the optical space switch 32 is of a 8×16 type while the wavelength selector 33 is of a 2×1 type. Therefore, the optical gate switches 22 required in the optical space switch 32 are equal in number to 128. The number of the optical gate switches 42 required per each wavelength selector 33 is equal to two. Thus, the optical switching apparatus requires 160 optical gate switches in total. On the other hand, in this embodiment, the optical space switch 32 requires 64 optical gate switches while each wavelength selector 33 requires 4 optical gate switches. Thus, the optical switching apparatus according to this embodiment requires 128 optical gate switches in total. Thus, the number is reduced to 4/5 as compared with the case where the wavelength shifters 7 (suffixes omitted) and the secondary-stage beam combiners 8 (suffixes omitted) are not provided.

Figure 12:
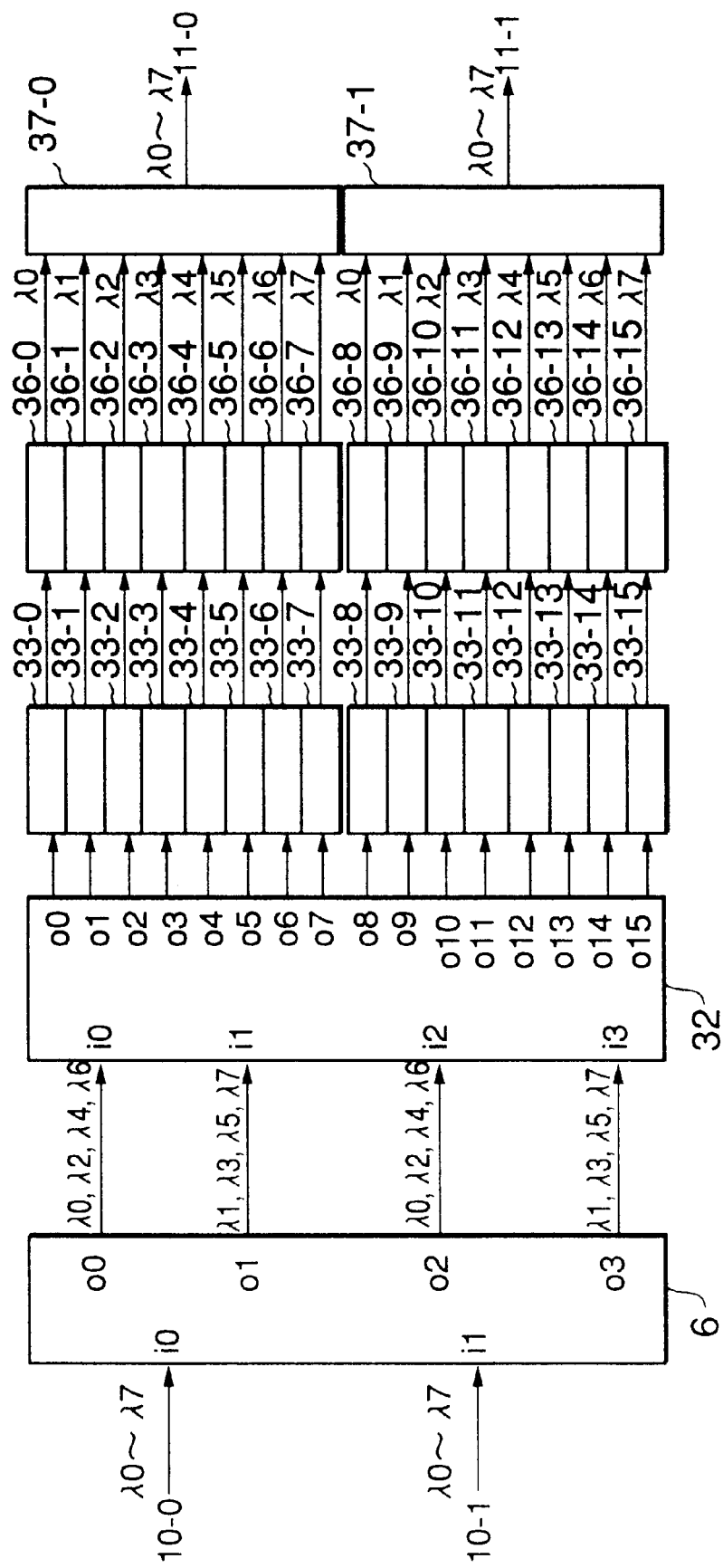
FIG. 12 illustrates another optical switching apparatus according to a third embodiment of the present invention.

Referring to FIG. 12, an optical switching apparatus according to a third embodiment of this invention is of a 16×16 wavelength-division/space-division type where M=8, N=2, K=4, and J=4. That is, M and N are not equal to J and K, respectively.

A zeroth input WDM optical signal supplied through the zeroth input port 10-0 and having the zeroth through the seventh wavelengths $\lambda 0$ through $\lambda 7$ is sent to the zeroth input port i0 of a wavelength router 6. Likewise, a first Input WDM optical signal supplied through the first input port 10-1 and having the zeroth through the seventh wavelengths $\lambda 0$ through $\lambda 7$ is sent to the first input port i1 of the wavelength router 6.

The wavelength router 6 in this embodiment is similar in structure and operation to that of the first embodiment and will not be described any longer. If the zeroth and the first WDM optical signals having the zeroth through the seventh wavelengths $\lambda 0$ through $\lambda 7$ are supplied to the zeroth and the first input ports i0 and i1 of the wavelength router 6, respectively, each of the zeroth and the second output ports o0 and o2 produces the WDM optical signal having the zeroth, the second, the fourth, and the sixth wavelengths $\lambda 0$, $\lambda 2$, $\lambda 4$, and $\lambda 6$ (the wavelength group A). On the other hand, each of the first and the third output ports o1 and o3 produces the WDM optical signals having the first, the third, the fifth, and the seventh wavelengths $\lambda 1$, $\lambda 3$, $\lambda 5$, and $\lambda 7$ (the wavelength group B).

The WDM optical signals having the wavelength groups A and B and produced from the wavelength router 6 are supplied to the optical space switch 32. The optical space switch 32 comprises a 4×16 optical crossbar switch adapted to perform 1-to-16 multicasting at maximum, and has the zeroth through the third input ports i0 through i3 and the zeroth through the fifteenth output ports o0 through o15. The optical space switch 32 directs the WDM optical signal supplied through each input port to a desired output port. Herein, arbitration control is carried out so that those WDM optical signals supplied through different input ports are not outputted through any common output port.

The optical space switch 32 in this embodiment is similar in structure and operation to that in FIG. 7 described in conjunction with the first embodiment and will not be described any longer. In this embodiment, the zeroth through the fifteenth switched WDM optical signals produced by the optical space switch 32 are also supplied to the zeroth through the fifteenth wavelength selectors 33-0 through 33-15, respectively. Each of the zeroth through the fifteenth wavelength selectors 33-0 through 33-15 selects and outputs a desired one of the four wavelengths of the switched WDM optical signal supplied thereto. The wavelength selectors 33 (suffixes omitted) in this embodiment are similar in structure and operation to those of the first embodiment and will not be described any longer. Specifically, the zeroth through the fifteenth selected optical signals produced by the wavelength selectors 33-0 through 33-15 are supplied to zeroth through fifteenth wavelength converters 36-0 through 36-15, respectively.

Each of the wavelength converters 36 (suffixes omitted) has a function of converting the wavelength of the optical signal supplied thereto into a predetermined specific wavelength.

Figure 13:
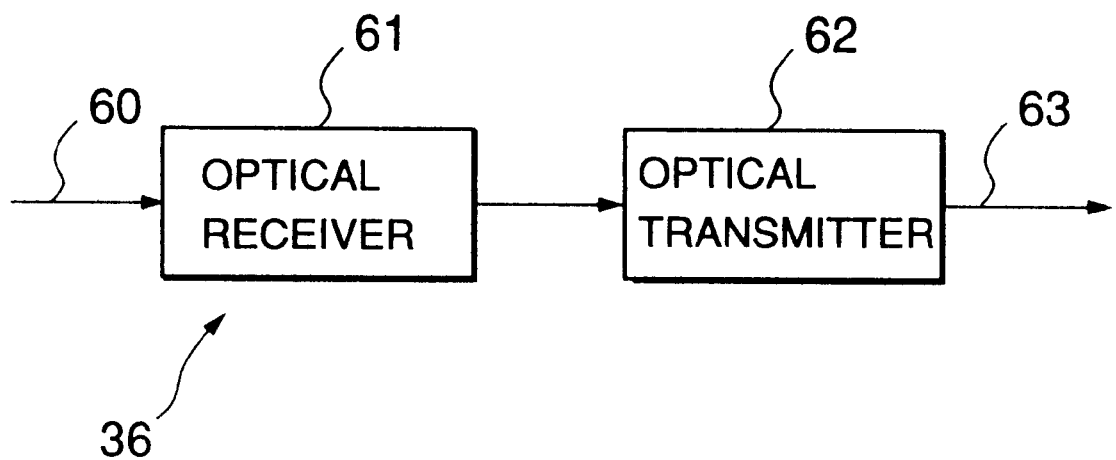
FIG. 13 shows a wavelength shifter adaptable to the apparatus illustrated in FIG. 12.

Referring to FIG. 13, the possible wavelength converter 36 comprises an Input optical fiber 60, an optical receiver 61, and an optical transmitter 62, and an output optical fiber 63. An optical signal of a desired wavelength is supplied through the input optical fiber 60 to the optical receiver 61 to be converted into an electrical signal. The electrical signal is converted by the optical transmitter 62 back into the optical signal. In the above-mentioned manner, if the optical transmitter 62 has the zeroth wavelength $\lambda 0$ as a transmission wavelength by way of example, wavelength conversion from the desired wavelength into the zeroth wavelength $\lambda 0$ is achieved by the possible wavelength converter 36.

The zeroth through the fifteenth wavelength converters 36-0 through 36-15 convert zeroth through fifteenth selected optical signals into zeroth through fifteenth wavelength converted optical signals, respectively. The zeroth through the seventh wavelength converted optical signals are supplied to the zeroth beam combiner 37-0. The eighth through the fifteenth wavelength converted optical signals are supplied to the first beam combiner 37-1. The zeroth beam combiner 37-0 combines the zeroth through the seventh wavelength converted optical signals to produce a zeroth WDM optical signal which is delivered to the zeroth output port 11-0. Likewise, the first beam combiner 37-1 combines the eighth through the fifteenth wavelength converted optical signals to produce a first WDM optical signal which is supplied to the first output port 11-1.

Thus, collective switching of the WDM optical signals and multicasting by the optical space switch 32, and wavelength selection by the wavelength selectors 33 (suffixes omitted), the optical switching apparatus of this embodiment has a function of a 16×16 crossbar network.

For example, it is assumed that connection between the zeroth wavelength $\lambda 0$ of the zeroth input port 10-0 and the zeroth wavelength $\lambda 0$ of the zeroth output port 11-0, and connection between the second wavelength $\lambda 2$ of the first input port 10-1 and the first wavelength $\lambda 1$ of the zeroth output port 11-0 are simultaneously carried out. In this event, the optical signal having the zeroth wavelength $\lambda 0$ and supplied through the zeroth input port 10-0 passes through the zeroth input port i0 of the wavelength router 6 to the zeroth output port o0 to be supplied to the zeroth input port i0 of the optical space switch 32. On the other hand, the optical signal having the second wavelength $\lambda 2$ and supplied through the first input port 10-1 passes through the first input port i1 of the wavelength router 6 to the zeroth output port o0 to be supplied to the zeroth input port i0 of the optical space switch 32. The optical space switch 32 multicasts to the zeroth and the first output ports o0 and o1 the WDM optical signal having the zeroth and the second wavelengths $\lambda 0$ and $\lambda 2$ and supplied from the zeroth input port i0. The zeroth wavelength selector 33-0 selects the optical signal having the zeroth wavelength $\lambda 0$. This optical signal is converted by the zeroth wavelength converter 36-0 into the zeroth wavelength $\lambda 0$ to be delivered through the zeroth beam combiner 37-0 to the zeroth output port 11-0. On the other hand, the first wavelength selector 33-1 selects the optical signal having the second wavelength $\lambda 2$. This optical signal is converted by the first wavelength converter 36-1 into the first wavelength $\lambda 1$ to be delivered through the first beam combiner 37-0 to the first output port 11-0. In the above-mentioned manner, the connection from the zeroth wavelength $\lambda 0$ on the zeroth input port 10-0 to the zeroth wavelength $\lambda 0$ on the zeroth output port 11-0 and the connection from the second wavelength $\lambda 2$ on the first input port 10-1 to the first wavelength $\lambda 1$ on the zeroth output port 11-0 are simultaneously carried out.

In the third embodiment, the wavelength router 6 serves as another optical converter to reduce the number of multiplexed wavelengths. Specifically, at the input of the wavelength router 6, the number of multiplexed wavelengths is equal to 8 and the number of multiplexed spaces is equal to 2. On the other hand, at the output, the number of multiplexed wavelengths is equal to 4 and the number of multiplexed spaces is equal to 4. There is a difference in wavelength between the WDM optical signal having the wavelength group A and produced from each of the zeroth and the second output ports o0 and o2 of the wavelength router 6 and the WDM optical signal having the wavelength group B and produced from each of the first and the third output ports o1 and o3. Therefore, the number of wavelengths used by the apparatus is equal to 8 in total. However, the number of multiplexed wavelengths on a single route is equal to 4 at maximum and the wavelength selectors 33 (suffixes omitted) similarly operate for both of the wavelength groups. Thus, the number of multiplexed wavelengths Is reduced to 4.

Such reduction in number of the multiplexed wavelengths provides the following two advantages. First, the number of the optical gate switches required in the apparatus is reduced. If the wavelength router 6 is not provided, the optical space switch 32 is of a 2×16 type while the wavelength selectors 33 is of a 8×1 type. Therefore, the number of the optical gate switches 22 required in the optical space switch 32 is equal to 32. The number of the optical gate switches 42 required per each wavelength selector 33 is equal to 8. Thus, the optical switching apparatus requires 160 optical gate switches in total. On the other hand, in this embodiment, the optical space switch 32 requires 64 optical gate switches while each wavelength selector 33 requires 4 optical gate switches. Thus, the optical switching apparatus of wavelength-division/space-division type according to this embodiment requires 128 optical gate switches in total. Thus, the number is reduced to 4/5 as compared with the case where the wavelength router 6 is not provided.

Figure 14:
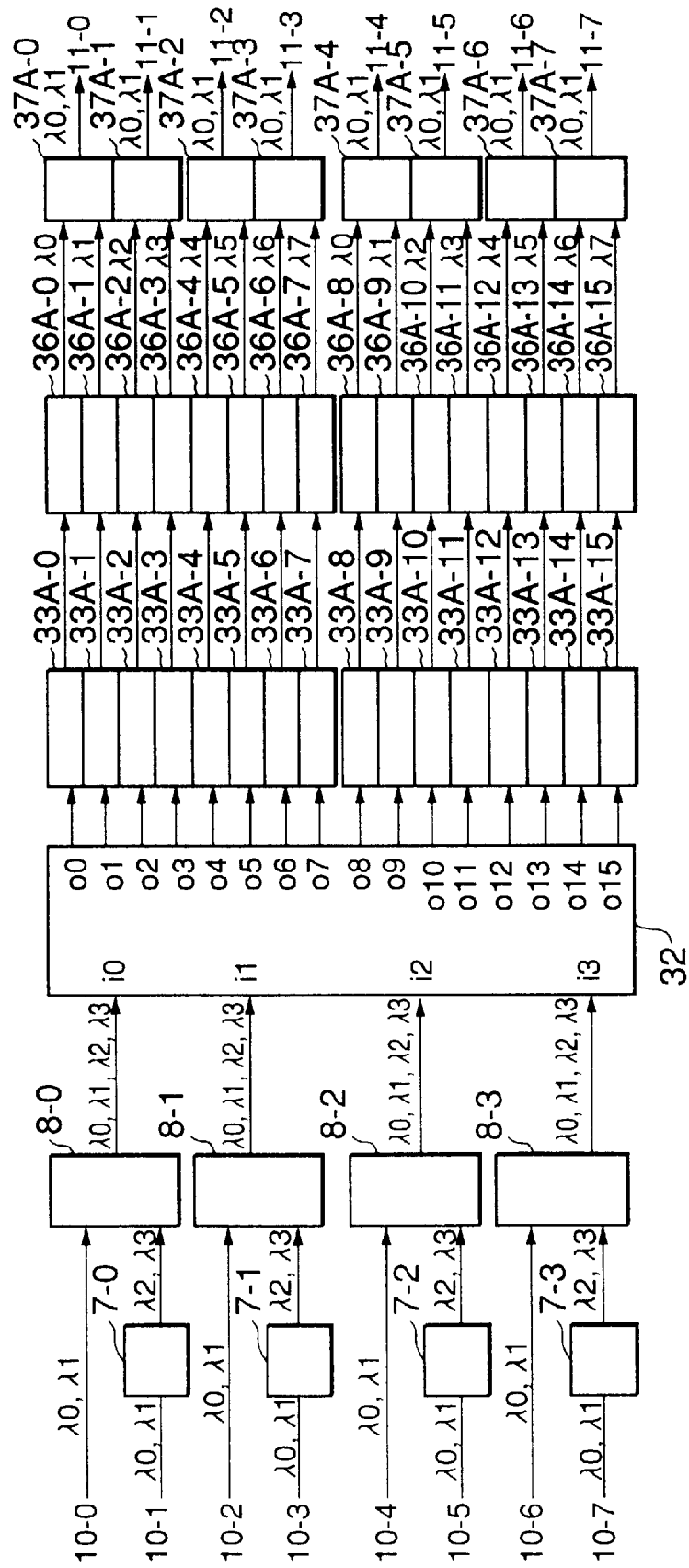
FIG. 14 shows another optical switching apparatus according to a fourth embodiment of this invention.

Second, the number of multiplexed wavelengths of the WDM optical signal supplied to the optical gate switch 22 of the optical space switch 32 is reduced so that the optical gate switch 22 as the semiconductor laser amplifier is hardly saturated. In absence of the wavelength router 6, eight wavelengths are supplied to the optical gate switch 22 at maximum. On the contrary, in this embodiment, four wavelengths are supplied at maximum. Thus, an intensity of optical signal for each wavelength can be increased to twice as compared with the case where the wavelength router 6 is not provided. Therefore, received power at the optical receiver 61 of the wavelength converter 36 (suffixes omitted) is increased to twice also Referring to FIG. 14, an optical switching apparatus according to a fourth embodiment of this invention is of a 16×16 wavelength-division/space-division type where M=2, N=8, K=4 and J=4. That is, M and N are not equal to J and K, respectively.

The zeroth through the seventh input WDM optical signals each of which has the zeroth and the first wavelengths $\lambda 0$ and $\lambda 1$ are supplied through the zeroth through the seventh input ports 10-0 through 10-7, respectively.

Among the zeroth through the seventh input WDM optical signals, the first, the third, the fifth, and the seventh input WDM optical signals are supplied to the zeroth through the third wavelength shifters 7-0 through 7-3, respectively. Each of the zeroth through the third wavelength shifters 7-0 through 7-3 wavelength-shifts the zeroth and the first wavelengths $\lambda 0$ and $\lambda 1$ of the input WDM optical signal supplied thereto into a wavelength-shifted WDM optical signal having the second and the third wavelengths $\lambda 2$ and $\lambda 3$. Specifically, the zeroth wavelength shifter 7-0 wavelength-shifts the first input WDM optical signal to produce a zeroth wavelength-shifted WDM optical signal. The first wavelength shifter 7-1 wavelength-shifts the third input WDM optical signal to produce a first wavelength-shifted WDM optical signal. The second wavelength shifter 7-2 wavelength-shifts the fifth input WDM optical signal to produce a second wavelength-shifted WDM optical signal. The third wavelength shifter 7-3 wavelength-shifts the seventh input WDM optical signal to produce a third wavelength-shifted WDM optical signal. The wavelength shifters 7 (suffixes omitted) are similar in structure and operation to those of the second embodiment and will not be described any longer.

The zeroth through the third wavelength-shifted WDM optical signals are supplied to one input ports of the zeroth through the third primary-stage beam combiners 8-0 through 8-3, respectively. On the other hand, the other input ports of the zeroth through the third primary-stage beam combiners 8-0 through 8-3 are also supplied with the zeroth, the second, the fourth, and the sixth input WDM optical signals each of which has the zeroth and the first wavelengths $\lambda 0$ and $\lambda 1$. The zeroth primary-stage beam combiner 8-0 combines the zeroth input WDM optical signal and the zeroth wavelength-shifted WDM optical signal to produce a zeroth primary-stage WDM optical signal having the zeroth through the third wavelengths $\lambda 0$ through $\lambda 3$. Likewise, the first primary-stage beam combiner 8-1 combines the second input WDM optical signal and the first wavelength-shifted WDM optical signal to produce a first primary-stage WDM optical signal having the zeroth through the third wavelengths $\lambda 0$ through $\lambda 3$. The second primary-stage beam combiner 8-2 combines the fourth input WDN optical signal and the second wavelength-shifted WDM optical signal to produce a second primary-stage WDM optical signal having the zeroth through the third wavelengths $\lambda 0$ through $\lambda 3$. The third primary-stage beam combiner 8-3 combines the sixth input WDM optical signal and the third wavelength-shifted WDM optical signal to produce a third primary-stage WDM optical signal having the zeroth through the third wavelengths $\lambda 0$ through $\lambda 3$. The zeroth through the third primary-stage WDM optical signals are supplied to the optical space switch 32.

The optical space switch 32 illustrated in the figure comprises a 4×16 optical crossbar switch adapted to perform 1-to-16 multicasting at maximum, and has the zeroth through the third input ports i0 through i3 and the zeroth through the fifteenth output ports o0 through o15. The optical space switch 32 directs the primary-stage WDM optical signal supplied through each input port to a desired output port. Herein, arbitration control is carried out so that those WDM optical signals supplied through different input ports are not outputted from any common output port. The optical space switch 32 in this embodiment is similar in structure and operation to that of the first embodiment and will not be described any longer. The optical space switch 32 produces the zeroth through the fifteenth switched WDM optical signals from the zeroth through the fifteenth output ports o0 through o15, respectively.

The zeroth through the fifteenth switched WDM optical signals produced by the optical space switch 32 are supplied to the zeroth through the fifteenth wavelength selectors 33A-0 through 33A-15, respectively.

Each of the wavelength selectors 33A selects and outputs a desired one of the four wavelengths of the switched WDM optical signal supplied thereto. The wavelength selectors 33A in this embodiment are similar in structure and operation to those In the second embodiment and will not be described any longer.

The zeroth through the fifteenth wavelength selectors 33A-0 through 33A-15 select the optical signals of desired wavelengths from the zeroth through the fifteenth switched WDM optical signals and produce the zeroth through the fifteenth selected optical signals, respectively. The zeroth through the fifteenth selected optical signals produced by the zeroth through the fifteenth wavelength selectors 33A-0 through 33A-15 are supplied to the zeroth through the fifteenth wavelength converters 36A-0 through 36A-15, respectively.

Each of the wavelength converters 36A (suffixes omitted) has a function of converting the wavelength of the input optical signal supplied thereto into a predetermined specific wavelength. The wavelength converters 36A are similar in structure and operation to the wavelength converters 36 in the third embodiment and will not be described any longer.

The zeroth through the fifteenth wavelength converters 36A-0 through 36A-15 convert the zeroth through the fifteenth selected optical signals into the zeroth through the fifteenth wavelength-converted optical signals. In the example illustrated in the figure, each of the zeroth, the second, the fourth, the sixth, the eighth, the tenth, the twelfth, and the fourteenth wavelength-converted optical signals has the zeroth wavelength $\lambda 0$ while each of the first, the third, the fifth, the seventh, the eleventh, the thirteenth, and the fifteenth wavelength-converted optical signals has the first wavelength $\lambda 1$.

The zeroth and the first wavelength-converted optical signals are supplied to a zeroth final-stage beam combiner 37A-0. The second and the third wavelength-converted optical signals are supplied to a first final-stage beam combiner 37A-1. The fourth and the fifth wavelength-converted optical signals are supplied to a second final-stage beam combiner 37A-2. The sixth and the seventh wavelength-converted optical signals are supplied to a third final-stage beam combiner 37A-3. The eighth and the ninth wavelength-converted optical signals are supplied to a fourth final-stage beam combiner 37A-4. The tenth and the eleventh wavelength-converted optical signals are supplied to a fifth final-stage beam combiners 37A-5. The twelfth and the thirteenth wavelength-converted optical signals are supplied to a sixth final-stage beam combiner 37A-6. The fourteenth and the fifteenth wavelength-converted optical signals are supplied to a seventh final-stage beam combiner 37A-7.

The zeroth final-stage beam combiner 37A-0 combines the zeroth and the first wavelength-converted optical signals to produce a zeroth WDM optical signal which is delivered to the zeroth output port 11-0. Likewise, the first final-stage beam combiner 37A-1 combines the second and the third wavelength-converted optical signals to produce a first WDM optical signal which is delivered to the first output port 11-1. The second final-stage beam combiner 37A-2 combines the fourth and the fifth wavelength-converted optical signals to produce a second WDM optical signal which is delivered to the second output port 11-2. The third final-stage beam combiner 37A-3 combines the sixth and the seventh wavelength-converted optical signals to produce a third WDM optical signal which is delivered to the third output port 11-3. The fourth final-stage beam combiner 37A-4 combines the eighth and the ninth wavelength-converted optical signals to produce a fourth WDM optical signal which is delivered to the fourth output port 11-4. The fifth final-stage beam combiner 37A-5 combines the tenth and the eleventh wavelength-converted optical signals to produce a fifth WDM optical signal which is delivered to the fifth output port 11-5. The sixth final-stage beam combiner 37A-6 combines the twelfth and the thirteenth wavelength-converted optical signals to produce a sixth WDM optical signal which is delivered to the sixth output port 11-6. The seventh final-stage beam combiner 37A-7 combines the fourteenth and the fifteenth wavelength-converted optical signals to produce a seventh WDM optical signal which is delivered to the seventh output port 11-7.

Thus, by collective switching of the WDM optical signals and multicasting by the optical space switch 32, and wavelength selection by the wavelength selectors 33 (suffixes omitted), the optical switching apparatus of wavelength-division/space-division type has a function of a 16×16 crossbar network.

For example, it is assumed that connection between the optical signal having the zeroth wavelength $\lambda 0$ on the zeroth input port 10-0 and the optical signal having the zeroth wavelength $\lambda 0$ on the zeroth output port 11-0, and connection between the optical signal having the zeroth wavelength $\lambda 0$ on the first input port 10-1 and the optical signal having the first wavelength $\lambda 1$ on the zeroth output port 11-0 are simultaneously carried out. In this event, the optical signal having the zeroth wavelength $\lambda 0$ and supplied from the zeroth input port 10-0 passes through the zeroth primary-stage beam combiner 8-0 to be supplied to the zeroth input port of the optical space switch 32. On the other hand, the optical signal having the zeroth wavelength $\lambda 0$ and supplied from the first input port 10-1 is wavelength-shifted by the zeroth wavelength shifter 7-0 into an optical signal having the second wavelength $\lambda 2$ which is delivered through the zeroth primary-stage beam combiner 8-0 to be supplied to the zeroth input port i0 of the optical space switch 32. The optical space switch 32 multicasts to the zeroth and the first output ports o0 and o1 the WDM optical signal having the zeroth and the second wavelengths $\lambda 0$ and $\lambda 2$ and supplied from the zeroth input port i0. The zeroth wavelength selector 33A-0 selects the optical signal having the zeroth wavelength $\lambda 0$. This optical signal is converted by the zeroth wavelength converter 36A-0 into the optical signal having the zeroth wavelength $\lambda 0$ which is delivered through the zeroth final-stage beam combiner 37A-0 to the zeroth output port 11-0. On the other hand, the first wavelength selector 33A-1 selects the optical signal having the second wavelength $\lambda 2$. The optical signal is converted by the first wavelength converter 36A-1 into the optical signal having the first wavelength $\lambda 1$ which is delivered through the zeroth final-stage beam combiner 37A-0 to the zeroth output port 11-0. In the above-mentioned manner, the connection from the optical signal having the zeroth wavelength $\lambda 0$ on the zeroth input port 10-0 to the optical signal having the zeroth wavelength $\lambda 0$ on the zeroth output port 11-0, and the connection from the optical signal having the zeroth wavelength $\lambda 0$ on the first input port 10-1 to the optical signal having the first wavelength $\lambda 1$ on the zeroth output port 11-0 are simultaneously achieved.

In the fourth embodiment, the wavelength shifters 7 (suffixes omitted) serve as another optical converter to increase the number of multiplexed wavelengths. Specifically, in the input ports 10 (suffixes omitted), the number of multiplexed wavelengths is equal to 2 while the number of multiplexed spaces is equal to 8. On the other hand, at the output of the primary-stage beam combiners 8 (suffixes omitted), the number of multiplexed wavelengths is equal to 4 and the number of multiplexed spaces is equal to 4.

The increase in number of multiplexed wavelengths results in reduction of the optical gate switches required in the apparatus. Specifically, in absence of the wavelength shifters 7 (suffixes omitted) and the primary-stage beam combiners 8 (suffixes omitted), the optical space switch 32 is of an 8×16 type while the wavelength selector 33 is of a 2×1 type. Therefore, the optical gate switches 22 required in the optical space switch 32 is equal to 128 while the optical gate switches 42 required per each wavelength selector 33 is equal to 2. Thus, the optical switching apparatus requires 160 optical gate switches in total. On the other hand, in this embodiment, the optical space switch 32 requires 64 optical gate switches while each wavelength selector 33 requires 4 optical gate switches. Therefore, according to the embodiment, the optical switching apparatus of wavelength-division/space-division type requires 128 optical gate switches in total. Thus, the number is reduced to 4/5 as compared with the case where the wavelength shifters 7 (suffixes omitted) and the next-stage beam combiners 8 (suffixes omitted) are not provided.

It will be understood that this invention is not restricted to the foregoing embodiments and can be modified in various other manners within the scope set forth in the appended claims. For example, the values M, N, K and J can be selected within the range specified in the claims.

In the first and the third embodiments, the wave-length routers comprise optical converters. On the other hand, in the second and fourth embodiments, the wavelength shifters and the secondary-stage beam combiners comprise optical converters. However, the optical converter is not restricted to the above-mentioned structure but may be another structure which has a function adapted to the present invention.

In the first through the fourth embodiments, the optical space switch 32 is of splitter/combiner type using the optical gate switches. However, the optical space switch is not restricted to the above-mentioned structure but may be an optical matrix switch made of lithium niobate or the like and having an electro-optic effect or an acousto-optic effect, a mechanical optical switch, or a liquid-crystal optical switch.

In the first through the fourth embodiments, each of the wavelength selectors 33 (suffixes omitted) and 33A (suffixes omitted) comprises the wavelength demultiplexer, the optical gate switch, and the beam combiner. However, the wavelength selector is not restricted to the above-mentioned structure but may comprise a combination of the wavelength demultiplexer and the optical matrix switch, or a wavelength tunable optical filter such as an acousto-optic optical filter, a fiber Fabry-Pérot optical filter, and a angle-tuned interference optical filter.

In the first through the fourth embodiments, the optical gate switch in the optical space switch 32 and the wavelength selector 33 or 33A comprises a semiconductor laser amplifier. However, the optical gate switch is not restricted to the above-mentioned structure but may comprise a electro-absorption optical modulator formed by a semiconductor, an optical gate switch made of lithium niobate having the electro-optic effect or the acousto-optic effect, a mechanical optical switch, or a liquid-crystal optical switch.

In the first and the third embodiments, the wavelength router 6 comprises a silica arrayed-waveguide grating-type device formed on the silicon substrate. However, the wavelength router is not restricted to the above-mentioned structure but may be an arrayed-waveguide grating type device formed on a semiconductor substrate, a reflection-type grating device, or a Fabry-Pérot optical filter, a Mach-Zehnder optical filter, an interference optical filter, and a combination thereof.

In the second and the fourth embodiments, each of the wavelength shifters 7 (suffixes omitted) utilizes four-wave-mixing in the semiconductor laser amplifier. However, the wavelength shifter is not restricted to the above-mentioned structure but may utilize four-wave-mixing in the optical fiber.

In the third and the fourth embodiments, each of the wavelength converters 36 (suffixes omitted) and 36A (suffixes omitted) comprises a combination of the optical receiver and the optical transmitter. However, the wavelength converter is not restricted to the above-mentioned structure but may utilize four-wave-mixing in a medium such as a semiconductor and silica or may utilize a nonlinear optical effect such as a cross gain modulation.

In the third and the fourth embodiments, the optical switching apparatus of wavelength-division/space-division type comprises a combination of the optical space switch, the wavelength selector, the wavelength converter, and the beam combiner. However, the apparatus of wavelength-division/space-division type is not restricted to the above-mentioned structure but may comprise a combination of the wavelength demultiplexer, the optical space switch, the wavelength converter, and the beam combiner.

As thus far been described, according to the third and the fourth embodiments of this invention, it is possible to reduce the number of multiplexed wavelengths in the optical switching apparatus of space division type or in the optical switching apparatus of wavelength-division/space-division type. In addition, according to the second and the fourth embodiments of this invention, it is possible to increase the number of multiplexed wavelengths. By such increase or decrease, the number of the multiplexed wavelengths can be optimized. This provides the following practical advantages. First, it is possible to minimize a hardware amount such as the optical gate switch required in the exchange. Second, if the number of the multiplexed wavelengths is reduced, the laser amplifier used as the optical gate switch is hardly saturated.

What is claimed is:

1. An optical switching apparatus comprising:
    an optical converter, responsive to N WDM optical signals each of which has M multiplexed wavelengths, for converting said N WDM optical signals into K input WDM optical signals each of which has J multiplexed wavelengths, wherein all of N, M, K and J are integers not less than two and J*K is equal to M*N:
    an optical space switch having K input ports and M*N output ports, for responding to K input WDM optical signals to produce M*N switched WDM optical signals through the M*N output ports, and
    M*N wavelength selectors responsive to said M*N switched WDM optical signals, respectively, for selecting one of J wavelengths multiplexed into the responding switched WDM optical signal.

2. An optical switching apparatus as claimed in claim 1, K being equal to J, wherein said optical space switch has K*M*N optical gate switches while each of said wavelength selectors has J optical gate switches.

3. An optical switching apparatus as claimed in claim 1, M being larger than N, wherein said optical converter comprises a wavelength router responsive to said N WDM optical signals, for optically routing said N WDM optical signals in connection with wavelength to produce K routed WDM optical signals as said K input WDM optical signals, each of which has J multiplexed wavelengths.

4. An optical switching apparatus as claimed in claim 3, further comprising, as a prior stage of said optical converter, optical multiplexers, N in number, responsive to N optical signal groups each of which comprises M optical signals having different wavelengths from each other, said N optical multiplexers being for multiplexing said M optical signals of N optical signal groups, respectively, to produce said N WDM optical signals.

5. An optical switching apparatus as claimed in claim 3, further comprising:
   N conversion groups each of which comprises M wavelength converters producing H converted wavelength signals different from each other; and
   N last-stage optical multiplexers responsive to M converted wavelength signals of N conversion groups, respectively, for multiplexing said converted wavelength signals into N last WDM optical signals.

6. An optical switching apparatus as claimed in claim 1, M being smaller than N, wherein said optical converter comprises:
   (N–K) wavelength shifters which are responsive to (N–K) ones of said N WDM optical signals and are grouped into K sub-groups, for optically shifting said (N–K) WDM optical signals to produce (N–K) shifted WDM optical signals in connection with wavelengths so that the shifted WDM optical signals have different wavelengths from each other at each of said K sub-groups; and
   K additional optical multiplexers, responsive to the shifted WDM optical signals from said (N–K) wavelength shifters and the remaining ones of N WDM optical signals, for multiplexing said shifted WDM optical signals and the remaining WDM optical signals not passing through said wavelength shifters to produce, as said K input WDM optical signals, K additional WDM optical signals each of which has J multiplexed wavelengths.

7. An optical switching apparatus as claimed in claim 6, further comprising, as a prior stage of said optical converter, optical multiplexers, N in number, responsive to N optical signal groups each of which comprises M optical signals having different wavelengths from each other, said N optical multiplexers being for multiplexing said M optical signals of N optical signal groups, respectively, to produce said N WDM optical signals.

8. An optical switching apparatus as claimed in claim 6, further comprising;
   N conversion groups each of which comprises M wavelength converters producing H converted wavelength signals different from each other; and
   N last-stage optical multiplexers responsive to M converted wavelength signals of N conversion groups, respectively, for multiplexing said converted wavelength signals into N last WDM optical signals.

9. An optical switching apparatus comprising:
   an optical converter, responsive to N WDM optical signals each of which has M multiplexed wavelength, for converting said N WDM optical signals into K input WDM optical signals each of which has J multiplexed wavelength, wherein all of N, M, K and J are Integers not less than two and J*K is equal to M*N; and
   an optical wavelength-division/space-division switch comprising K input ports each of which is supplied the responding input WDM optical signal having J multiplexed wavelength.

10. An optical switching apparatus as claimed in claim 9, M being larger than N, wherein said optical converter comprises a wavelength router responsive to said N WDM optical signals, for optically routing said N WDM optical signals in connection with wavelength to produce K routed WDM optical signals as said K input WDM optical signals, each of which has J multiplexed wavelengths.

11. An optical switching apparatus as claimed in claim 9, M being smaller than N, wherein said optical converter comprises:
   (N–K) wavelength shifters which are responsive to (N–K) ones of said N WDM optical signals and are grouped into K sub-groups, for optically shifting said (N–K) WDM optical signals to produce (N–K) shifted WDM optical signals in connection with wavelengths so that the shifted WDM optical signals have different wavelengths from each other at each of said K sub-groups; and
   K additional optical multiplexers, responsive to the shifted WDM optical signals from said (N–K) wavelength shifters and the remaining ones of N NDM optical signals, for multiplexing said shifted WDM optical signals and the remaining WDM optical signals not passing through said wavelength shifters to produce, as said K input WDM optical signals, K additional WDM optical signals each of which has J multiplexed wavelengths.

12. A method of delivering a plurality of WDM optical signals, N in number, to a plurality of output ports of an optical space switch, each of said WDM optical signals having M multiplexed wavelength, comprising preliminarily processing the WDM optical signals in relation to the number K of input ports of the optical space switch, by optically processing the WDM optical signals so that the number J of wavelength of each processed WDM optical signal transmitting into the responding input port is equal to M*N/K.

13. A method as claimed in claim 12, comprising using the optical space switch which further has K*M*N optical gate switches and which is connected to M*N wavelength selectors each comprising K additional optical gate switches, after the preliminarily processing.

14. A method as claimed in claim 13, wherein said the number K of processed WDM optical signals and the processed number J of wavelengths of each processed WDM optical signal is equal to each other.

15. A method as claimed in claim 12, M being larger than N, wherein said preliminary processing comprising, responsive to N WDM optical signals each of which has M multiplexed wavelengths, carrying out wavelength routing for said N WDM optical signals to produce K routed WDM optical signals as said K input WDM optical signals, each of which has J multiplexed wavelengths.

16. A method as claimed in claim 14, M being smaller than N, wherein said preliminarily processing comprising:
   responsive to N WDM optical signals each of which has M multiplexed wavelengths, grouping N WDM optical signals into K sub-groups which comprises N/K WDM optical signals;
   carrying out optical wavelength shifting for (N–K) ones of N WDM optical signals to make wavelengths of said (N–K) WDM optical signals different from each other at each K sub-group; and then
   carrying out optical multiplexing for said (N–K) WDM optical signals subjected to said shifting and K WDM optical signals not subjected to said shifting at each K sub-group to produce, as said K input WDM optical signals, K additional WDM optical signals each of which has J multiplexed wavelengths.

17. A method of delivering a plurality of WDM optical signals, N in number, to a plurality of output ports of an optical wavelength-division/space-division switch, each of said WDM optical signals having M multiplexed wavelength, comprising preliminarily processing the WDM optical signals in relation to the number K of input ports of the optical space switch, by optically processing the WDM optical signals so that the number J of wavelength of each processed WDM optical signal transmitting into the responding input port is equal to M*N/K.

18. A method as claimed in claim 17, wherein said the number K of processed WDM optical signals and the processed number J of wavelengths of each processed WDM optical signal is equal to each other, said method comprising using the optical space switch which further has K*M*N optical gate switches and which is connected to M*N wavelength selectors each comprising K additional optical gate switches, after the preliminarily processing.

19. A method as claimed in claim 17, M being larger than N, wherein said preliminary processing comprising, responsive to N WDM optical signals each of which has M multiplexed wavelengths, carrying out wavelength routing for said N WDM optical signals to produce K routed WDM optical signals as said K input WDM optical signals, each of which has J multiplexed wavelengths.

20. A method as claimed in claim 17, M being smaller than N, wherein said preliminarily processing comprising:
  responsive to N WDM optical signals each of which has M multiplexed wavelengths, grouping N WDM optical signals into K sub-groups which comprises N/K WDM optical signals;
  carrying out optical wavelength shifting for (N−K) ones of N WDM optical signals to make wavelengths of said (N−K) WDM optical signals different from each other at each K sub-group; and then
  carrying out optical multiplexing for said (N−K) WDM optical signals subjected to said shifting and K WDM optical signals not subjected to said shifting at each K sub-group to produce, as said K input WDM optical signals, K additional WDM optical signals each of which has J multiplexed wavelengths.

* * * * *